(12) United States Patent
Nakao

(10) Patent No.: US 12,159,029 B2
(45) Date of Patent: Dec. 3, 2024

(54) DISPLAY APPARATUS, DISPLAY SYSTEM, DISPLAY METHOD, AND NON-TRANSITORY RECORDING MEDIUM

(71) Applicant: Ryohji Nakao, Kanagawa (JP)

(72) Inventor: Ryohji Nakao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 18/300,746

(22) Filed: Apr. 14, 2023

(65) Prior Publication Data
US 2023/0333731 A1 Oct. 19, 2023

(30) Foreign Application Priority Data
Apr. 18, 2022 (JP) .................. 2022-068317

(51) Int. Cl.
*G06F 3/048* (2013.01)
*G06F 3/0482* (2013.01)
*G06F 3/04847* (2022.01)
*G06F 3/0485* (2022.01)
*G06F 3/0488* (2022.01)

(52) U.S. Cl.
CPC .......... *G06F 3/0488* (2013.01); *G06F 3/0482* (2013.01); *G06F 3/04847* (2013.01); *G06F 3/0485* (2013.01)

(58) Field of Classification Search
None
See application file for complete search history.

(56) References Cited

U.S. PATENT DOCUMENTS

| | | | | |
|---|---|---|---|---|
| 2008/0301811 A1* | 12/2008 | Jung | ............... | H04L 63/1458 726/22 |
| 2009/0161551 A1* | 6/2009 | Danner | ............... | H04L 41/5009 370/352 |
| 2009/0259958 A1* | 10/2009 | Ban | ............... | H04M 1/72469 345/173 |
| 2010/0306018 A1* | 12/2010 | Burtner | ............... | G06Q 10/10 705/7.19 |
| 2011/0279362 A1* | 11/2011 | Kikuchi | ............... | G06F 3/0304 345/156 |
| 2012/0005596 A1* | 1/2012 | Carlson | ............... | G06F 9/445 715/833 |
| 2012/0083260 A1* | 4/2012 | Arriola | ............... | G06F 16/252 455/418 |
| 2012/0254799 A1* | 10/2012 | Nonez | ............... | G06F 3/0483 715/823 |
| 2014/0062919 A1* | 3/2014 | Park | ............... | G06F 3/0484 345/173 |
| 2014/0189516 A1* | 7/2014 | Guo | ............... | G06F 3/04883 715/719 |

(Continued)

FOREIGN PATENT DOCUMENTS

| | | |
|---|---|---|
| JP | 2014-056455 | 3/2014 |
| JP | 2021-022041 | 2/2021 |
| JP | 2021-179649 | 11/2021 |

*Primary Examiner* — Hua Lu
(74) *Attorney, Agent, or Firm* — IPUSA, PLLC

(57) ABSTRACT

A display apparatus includes circuitry to display an object on a display. The circuitry stores, in a memory, display state data representing a display state of the object each time a condition is satisfied; receives selection of one of the display state data; and restores the display state of the object based on the selected display state data.

14 Claims, 28 Drawing Sheets

(56) References Cited

U.S. PATENT DOCUMENTS

| | | | | |
|---|---|---|---|---|
| 2014/0365882 A1* | 12/2014 | Lemay | ............... | G06F 3/016 |
| | | | | 715/256 |
| 2015/0120300 A1* | 4/2015 | Maruta | ............... | G06F 3/167 |
| | | | | 704/251 |
| 2015/0123915 A1* | 5/2015 | Iwaizumi | ............ | G06F 3/041 |
| | | | | 345/173 |
| 2016/0162143 A1* | 6/2016 | Ito | ............... | G06F 3/0485 |
| | | | | 345/173 |
| 2016/0259528 A1* | 9/2016 | Foss | ............... | G06T 13/80 |
| 2016/0364098 A1* | 12/2016 | Masaki | ............ | G06F 16/58 |
| 2017/0031542 A1* | 2/2017 | Ryu | ............... | G06F 3/04883 |
| 2017/0068443 A1* | 3/2017 | Lin | ............... | G06F 3/04883 |
| 2017/0075474 A1* | 3/2017 | Shigematsu | ........ | G06F 3/04883 |
| 2017/0091153 A1* | 3/2017 | Thimbleby | ......... | G06F 3/04845 |
| 2017/0277386 A1* | 9/2017 | Cho | ............... | G06F 3/04817 |
| 2017/0351402 A1* | 12/2017 | Yoakum | ............ | G06Q 10/00 |
| 2018/0074636 A1* | 3/2018 | Lee | ............... | H04M 1/724 |
| 2018/0074775 A1* | 3/2018 | Mabey | ............ | G06F 3/0484 |
| 2018/0335906 A1* | 11/2018 | He | ............... | G06F 3/0483 |
| 2019/0025997 A1* | 1/2019 | Nishio | ............ | G06F 3/14 |
| 2019/0036769 A1 | 1/2019 | Nakao et al. | | |
| 2020/0004394 A1* | 1/2020 | Li | ............... | G06F 3/0484 |
| 2020/0210700 A1* | 7/2020 | Oka | ............... | B25J 9/1661 |
| 2020/0293152 A1* | 9/2020 | Saraya | ............ | G06F 3/0481 |
| 2020/0363937 A1* | 11/2020 | Yang | ............ | G06F 3/04845 |
| 2021/0012574 A1* | 1/2021 | Fu | ............... | G06F 3/017 |
| 2021/0349584 A1* | 11/2021 | Lin | ............... | G06F 3/04845 |
| 2022/0262405 A1* | 8/2022 | Conlin | ............ | G06Q 10/06 |
| 2022/0291816 A1* | 9/2022 | Fan | ............... | G06F 3/04845 |
| 2022/0335807 A1* | 10/2022 | De Jong | ........ | H04W 12/63 |
| 2023/0073832 A1* | 3/2023 | Liu | ............... | G06F 3/04847 |
| 2023/0137492 A1* | 5/2023 | Zheng | ............ | G06F 3/04847 |
| | | | | 715/719 |

* cited by examiner

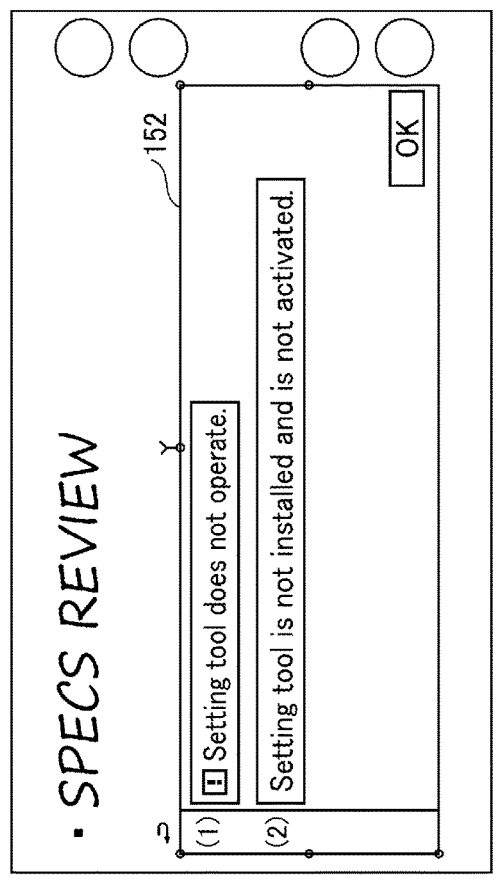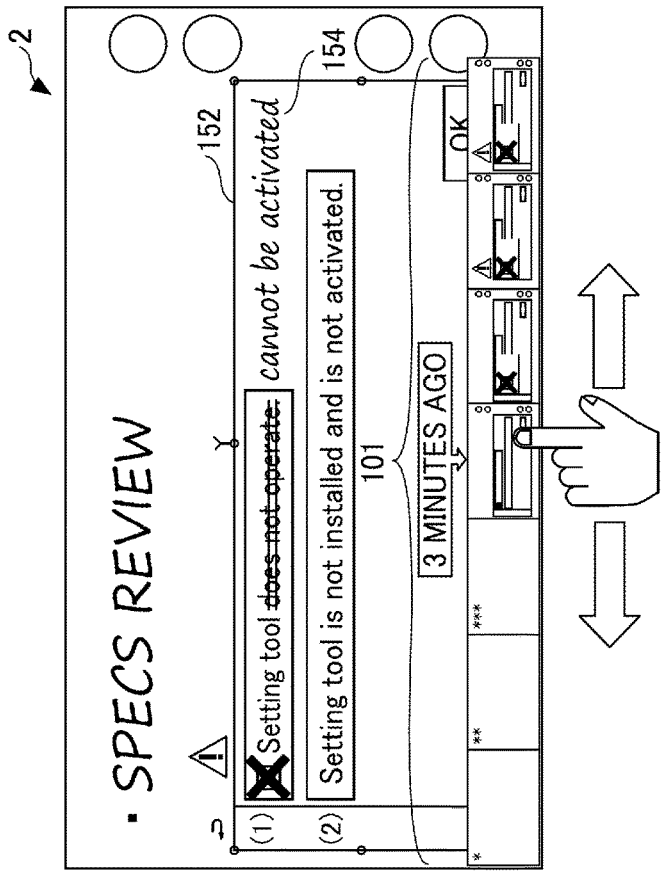

FIG. 15
| FIG. 15A |
| FIG. 15B |
| FIG. 15C |
FIG. 15A
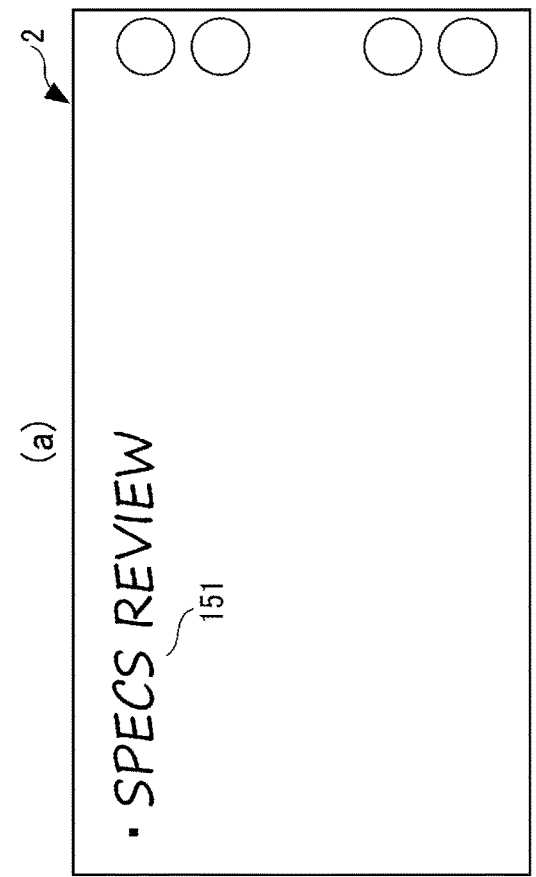
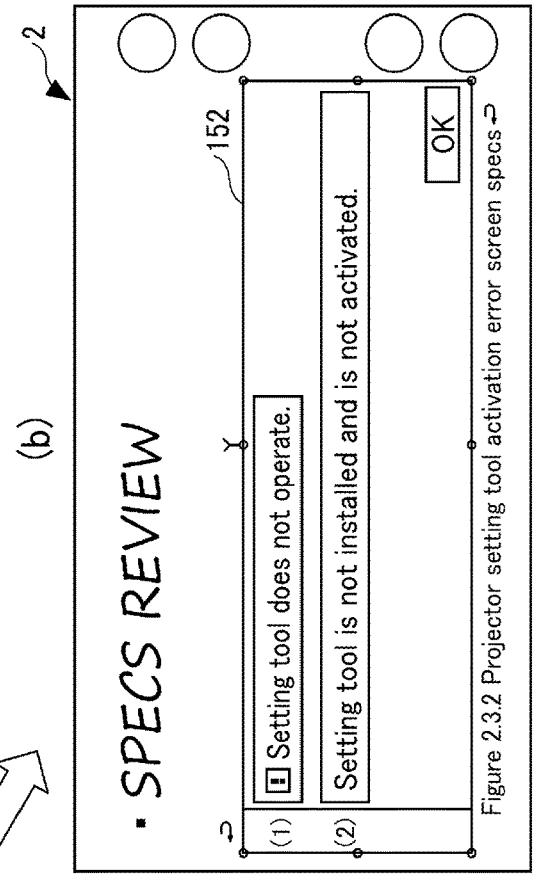

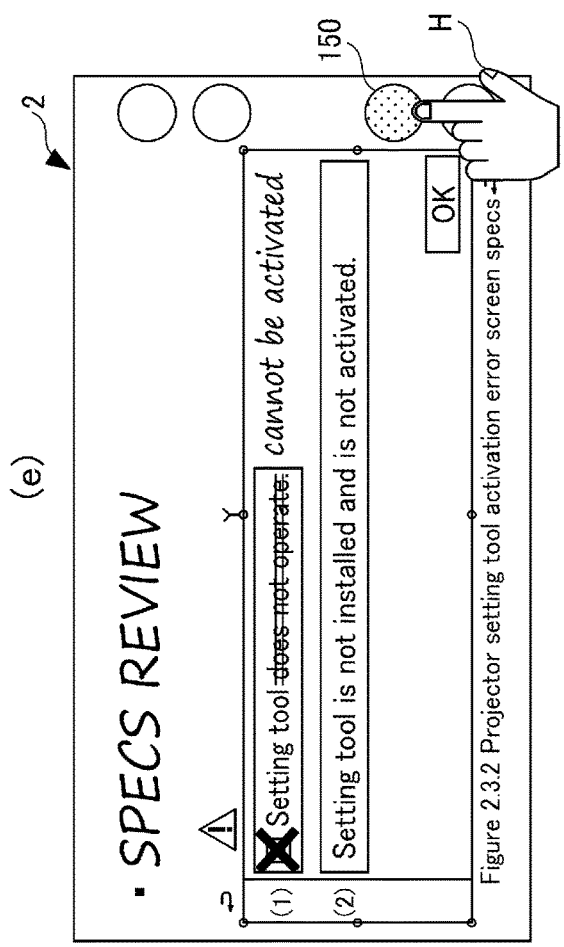

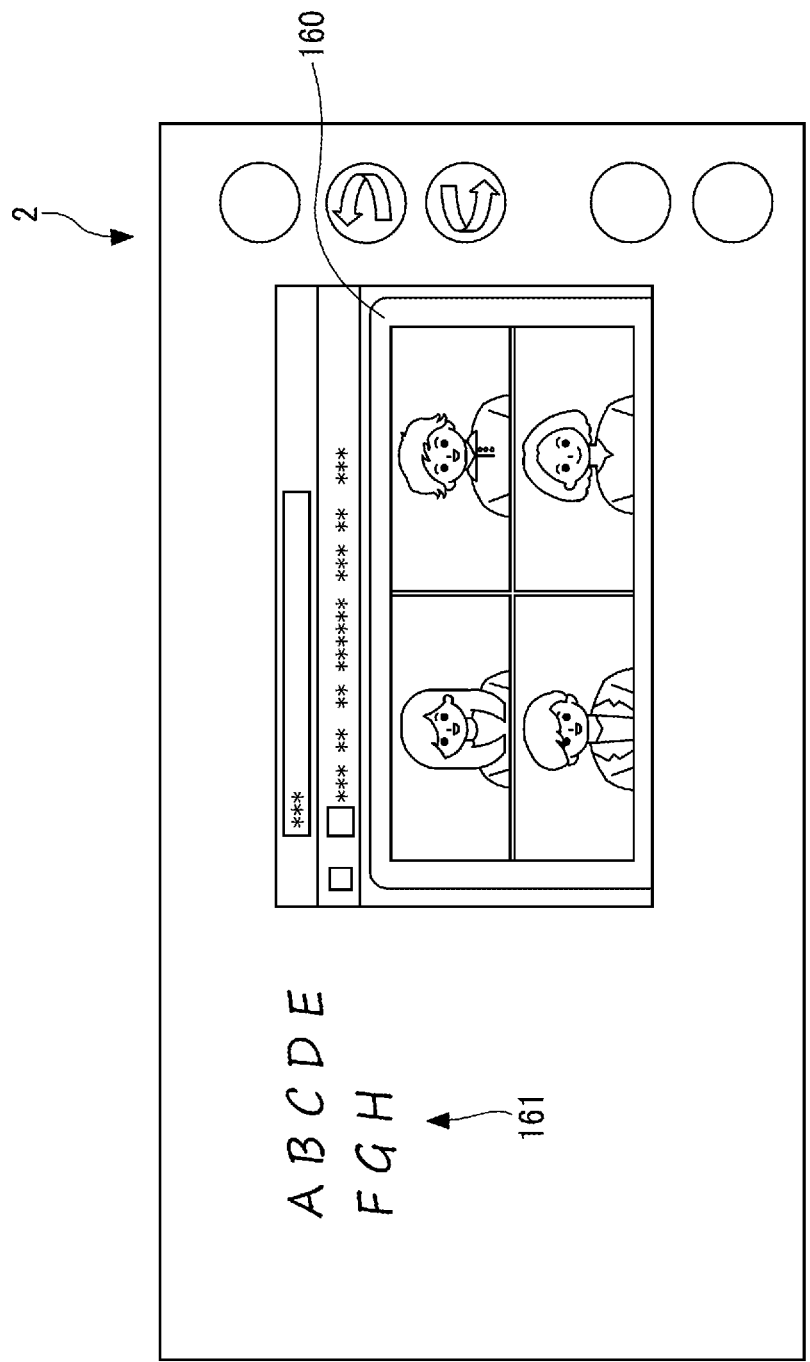

FIG. 17
| FIG. 17A |
|----------|
| FIG. 17B |
FIG. 17A (a)
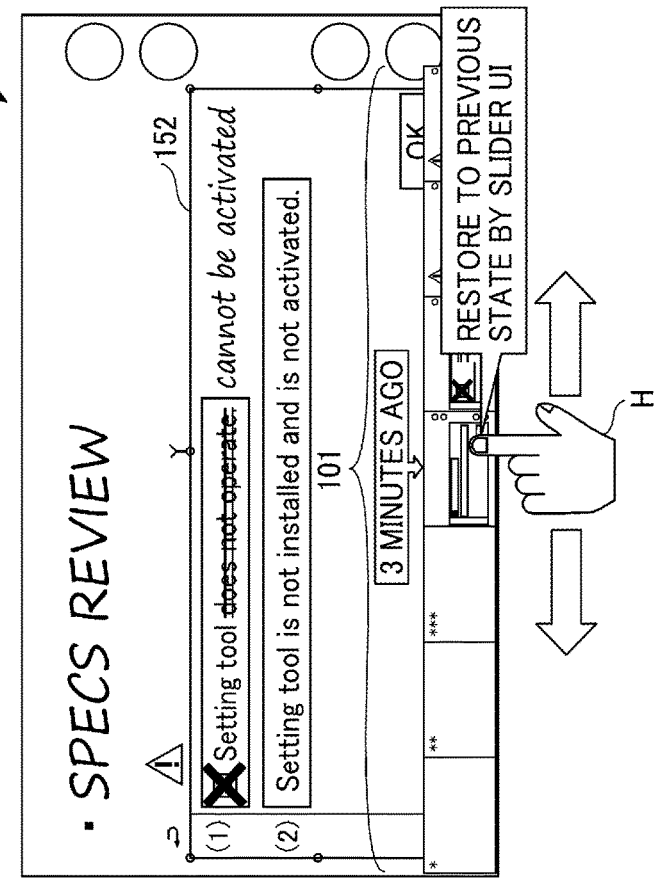
(b)
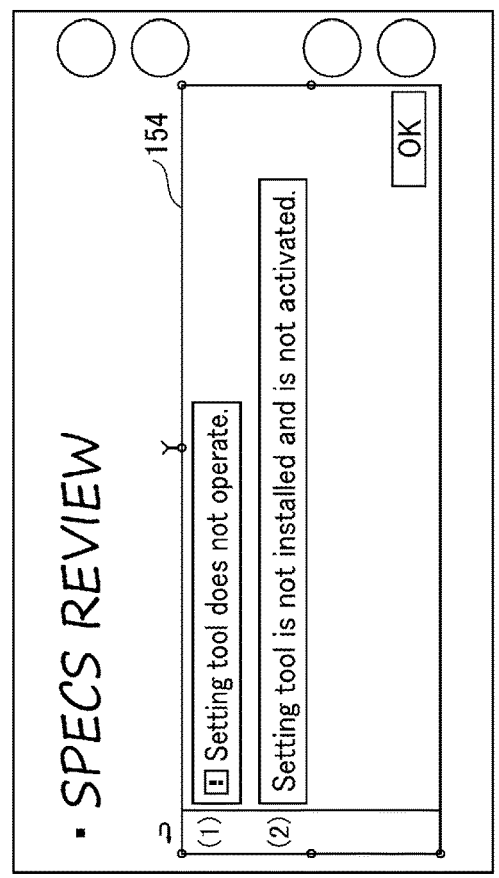

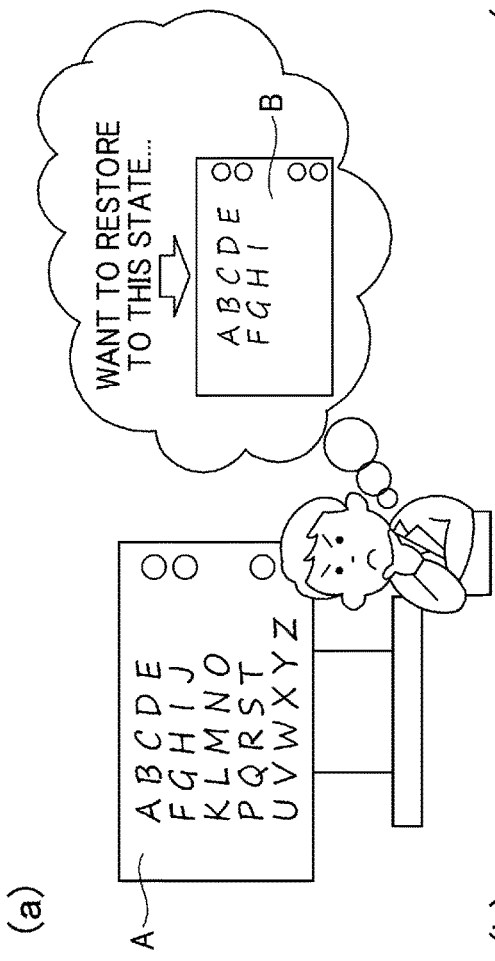
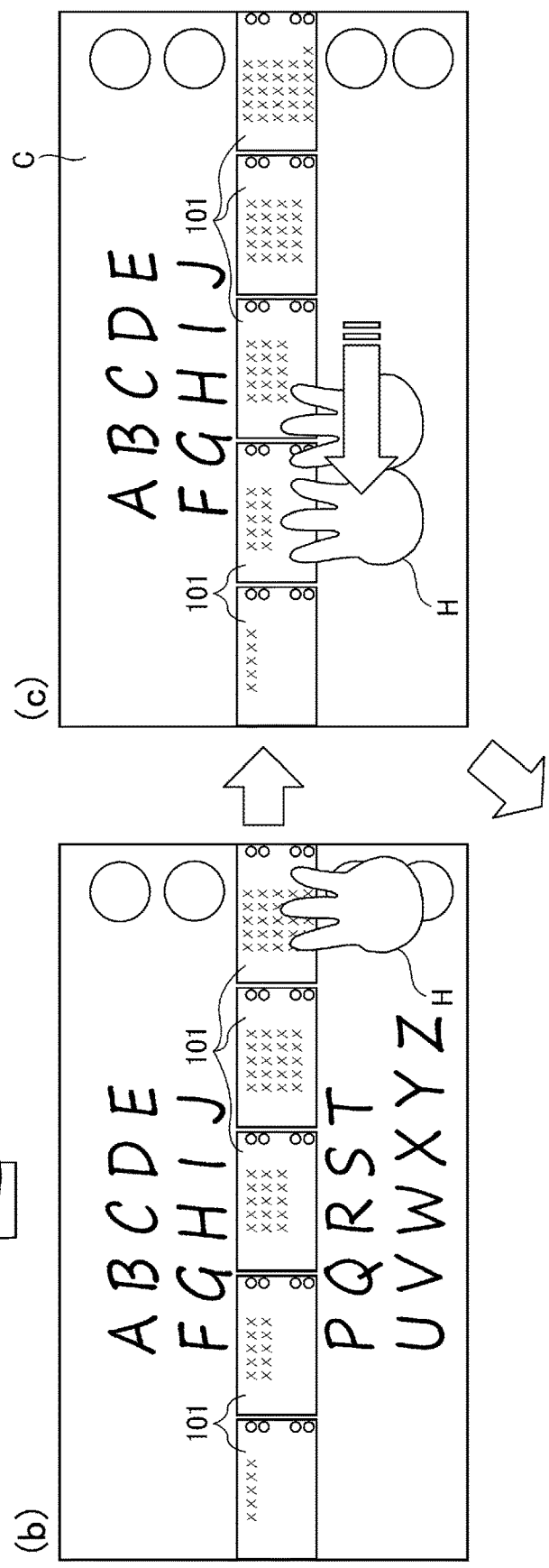

DISPLAY APPARATUS, DISPLAY SYSTEM, DISPLAY METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-068317, filed on Apr. 18, 2022, in the Japan Patent Office, the entire disclosure of which is hereby incorporated by reference herein.

BACKGROUND

Technical Field

Embodiments of the present disclosure relate to a display apparatus, a display system, a display method, and a non-transitory recording medium.

Related Art

There are display apparatuses such as electronic whiteboards having a touch panel display that displays hand drafted data drawn by a user with a dedicated electronic pen or a finger. Unlike a conventional whiteboard, such a display apparatus can store hand drafted data as electronic data and display an image of a material being displayed by an external device, such as a personal computer (PC), connected to the display apparatus.

Some display apparatuses are provided with undo and redo functions (undo/redo functions). The undo function refers to canceling a last operation in editing so that, for example, a document being edited reverts to a state before one operation, and the redo function refers to advancing the state by one operation. There is a technique for restoring the state of editing on a display apparatus, following back an operation history when the display apparatus is unintentionally terminated.

SUMMARY

In one aspect, a display apparatus includes circuitry to display an object on a display; store, in a memory, display state data representing a display state of the object each time a condition is satisfied; receive selection of one of the display state data; and restore the display state of the object based on the selected display state data.

In another aspect, a display method performed by a display apparatus includes displaying an object on a display; storing, in a memory, display state data representing a display state of the object each time a condition is satisfied; receiving selection of one of the display state data; and restoring the display state of the object based on the selected display state data.

In another aspect, a non-transitory recording medium stores a plurality of program codes which, when executed by one or more processors, causes the processors to perform the method described above.

In another aspect, a display system includes a server including first circuitry and a display apparatus including second circuitry. The second circuitry of the display apparatus displays an object on a display; receive an operation performed on the object to change a display state of the object; and transmit, to the server via a network, an operation content of the operation performed on the object. The first circuitry of the server stores, in a memory, display state data representing the display state of the object each time a condition is satisfied; restores the display state of the object based on the display state data in response to a request from the display apparatus; and transmits, to the display apparatus via the network, a plurality of images each of which represents the display state of the object restored based on the display state data. The second circuitry of the display apparatus linearly displays the plurality of images on the display.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 1A and 1B are diagrams illustrating an example of a schematic operation performed by a display apparatus to restore a display state;

FIGS. 15A, 15B, and 15C (FIG. 15) are diagrams illustrating an example of inputting an object by a user and a method for starting a time-series restoration mode according to the first embodiment;

FIG. 16 is a diagram illustrating an example of a window of another application displayed on a display;

FIGS. 17A and 17B (FIG. 17) are diagrams illustrating the time-series restoration mode according to embodiments;

FIGS. 22A and 22B (FIG. 22) are diagrams illustrating an example of a user interface different from that illustrated in FIG. 21 for restoring the display state in units of operations by combining the time-series restoration mode and the undo/redo functions;

Figure 2:
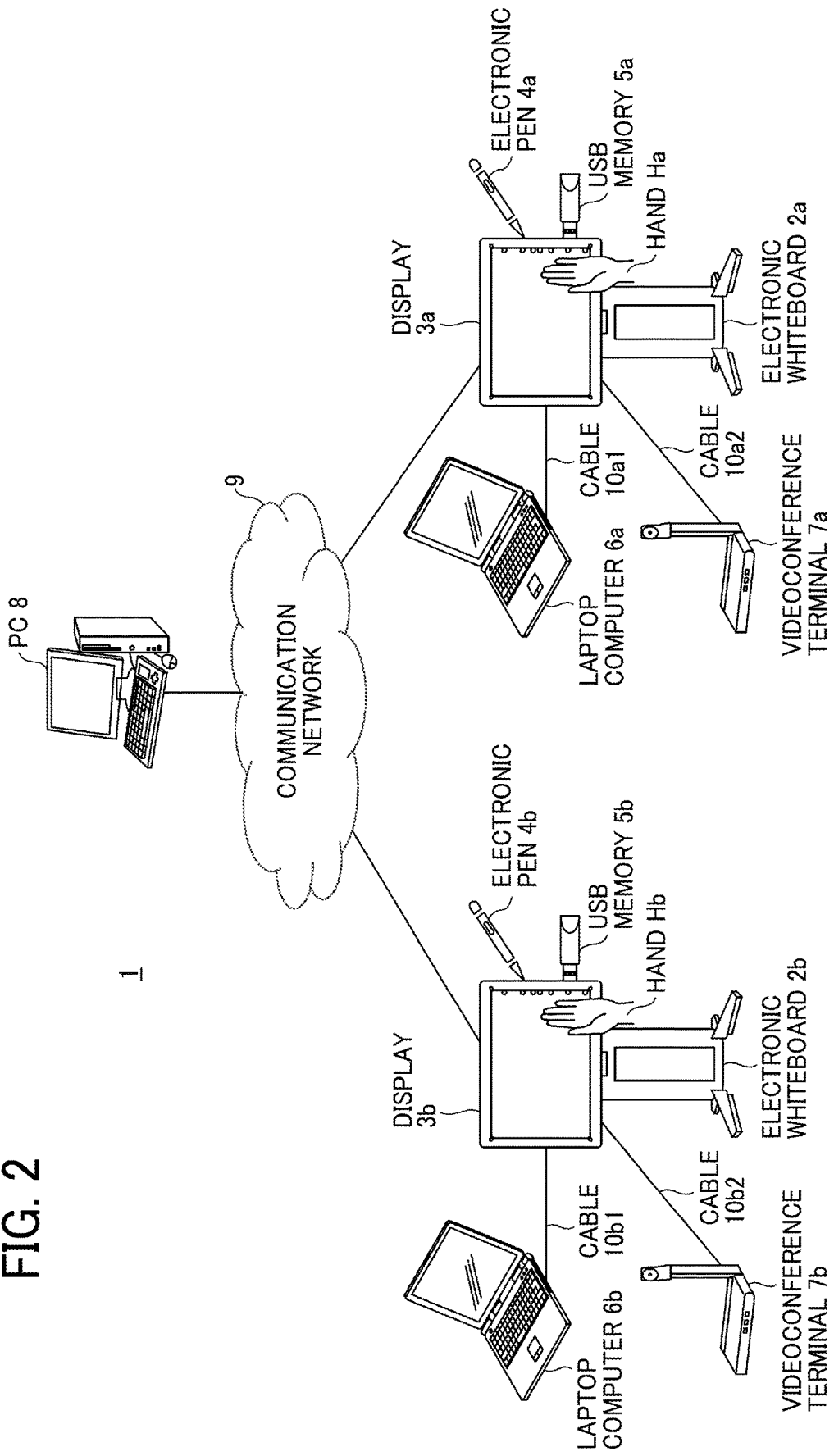
FIG. 2 is a schematic diagram illustrating a general arrangement of a communication system according to embodiments.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a display apparatus and a display method performed by the display apparatus according to embodiments of the present disclosure, with reference to the attached drawings.

Overview of Restoration of Display State

A description is given of an outline of a method for a display apparatus 2 to restore a display state of an object, with reference to FIG. 1. FIGS. 1A and 1B are diagrams illustrating an outline of an operation performed by the display apparatus 2 of the present embodiment to restore a display state. FIG. 1A illustrates an example of a screen in a time-series restoration mode. In FIG. 1A, a captured image 152 and hand drafted data 154 are displayed as objects. A user who wants to restore a display state at a certain past time point presses a button for transition to the time-series restoration mode. In the time-series restoration mode, the display apparatus 2 slidably displays a plurality of images respectively representing display states at different past time points. Hereinafter, this image is referred to as a thumbnail. When the user slides thumbnails 101 to the left or the right, the thumbnail 101 representing a previous display state or a more recent display state is displayed according to the sliding direction. The thumbnail 101 displayed in a slidable manner is an image of a display state of an object, for example, automatically stored at constant time intervals.

When the user selects a certain thumbnail 101, as illustrated in FIG. 1B, the display apparatus 2 displays the object in the display state corresponding to the selected thumbnail 101. In other words, the display apparatus 2 restores the display state at a certain past time point in the time-series restoration mode.

As described above, compared with conventional display apparatuses that restore the display state one by one to a state at a certain past time point by receiving undo/redo operations one by one, the display apparatus 2 according to the present embodiment restores the display state with a small number of operations (at least one operation), thus streamlining the restoration of the display state. In other words, the display apparatus 2 improves usability.

Terminology

"Input device" may be any means by which a user inputs handwriting (hand drafting) by designating coordinates on a touch panel. Examples thereof include an electronic pen, a human finger or hand, and a bar-shaped member.

A series of user operations including engaging a writing mode, recording a movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking a movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse. Alternatively, a stroke refers to tracing a movement of a portion of the user without contacting a display or screen, and the display apparatus can track the movement. In this case, the display apparatus may start tracking and recording a stroke (recognize engaging or turning on the writing mode) in response to a gesture of the user, pressing a button with a hand or a foot of the user, or other operation of, for example, using a mouse or pointing device. Further, the display apparatus may end tracking and recording a stroke (recognize disengaging or turning off the writing mode) in response to the same or different gesture, releasing the button, or other operation, for example using the mouse or pointing device.

"Stroke data" refers to data displayed on a display based on a trajectory of coordinates of a stroke input with the input device. The stroke data may be interpolated appropriately. "Hand drafted data" refers to data having one or more pieces of stroke data. "Hand drafted input" refers to a user input such as handwriting, drawing, and other forms of input. The hand drafted input may be performed via a touch interface with a tactile object such as an electronic pen or a stylus, or using the user's body. The hand drafted input may also be performed via other types of input, such as gesture-based input, hand motion tracking input or other touch-free input by the user. The embodiments of the present disclosure relate to handwriting and handwritten data, but other forms of hand drafted input may be utilized and are within the scope of the present disclosure.

An "object" refers to an item displayed, on a screen, based on stroke data.

The term "object" in this specification also represents an object to be displayed.

An "object" obtained by handwriting recognition or hand drafted recognition and conversion of stroke data may include, in addition to text, a stamp displayed as a given character or mark such as "complete," a shape such as a circle or a star, or a line. The "text" refers to a character string (character code) mainly including one or more characters and may also include numerals and symbols. The text may be referred to as a character string.

The "display state" refers to a mode in which an object appears on a screen of a display or a display apparatus. For example, the display state includes the position at which the object is displayed and the appearance of the object (color, thickness, line type of a stroke).

"Display state data" refers to data in which a display state is stored.

"Restoring the display state" refers to displaying an object in a previous state. The previous state is determined by a list of display state data stored for each object (object list). Alternatively, the previous state may be defined by a redo list or an undo list.

Example of System Configuration

FIG. 2 is a schematic diagram illustrating an overview of a communication system including a display apparatus according to the present embodiment. In the example illustrated in FIG. 2, a communication system 1 includes two display apparatuses 2a and 2b and elements such as electronic pens 4a and 4b related to the display apparatuses 2a and 2b for ease of explanation. However, the number of display apparatuses or electronic pens may be three or more.

As illustrated in FIG. 2, the communication system 1 includes the plurality of display apparatuses 2a and 2b, the plurality of electronic pens 4a and 4b, Universal Serial Bus (USB) memories 5a and 5b, laptop computers 6a and 6b, videoconference terminal (teleconference terminal) 7a and 7b, and a personal computer (PC) 8. In this example, the display apparatuses 2a and 2b are electronic whiteboards. The display apparatuses 2a and 2b and the PC 8 are connected to each other via a communication network 9 to communicate with each other. Further, the display apparatuses 2a and 2b include displays 3a and 3b (or screens), respectively.

The display apparatus 2a displays, on the display 3a, an image drawn by an event generated by the electronic pen 4a (e.g., a touch of the tip or bottom of the electronic pen 4a on the display 3a). The display apparatus 2a may change the image being displayed on the display 3a, according to an event made by the user's hand Ha in addition to the electronic pen 4a. An example of the event is a user hand gesture indicating enlargement, reduction, or page turning.

The USB memory 5a is connectable to the display apparatus 2a. The display apparatus 2a can read electronic files in, for example, a portable document format (PDF) from the USB memory 5a or can store an electronic file in the USB memory 5a. The display apparatus 2a is connected to the laptop computer 6a via a cable 10a1 capable of communicating in compliance with a communication standard such as DISPLAYPORT, a digital visual interface (DVI), and HIGH-DEFINITION MULTIMEDIA INTERFACE (HDMI), or Video Graphics Array (VGA). On the display apparatus 2a, an event is caused by a user operation of contact with the display 3a (screen). The display apparatus 2a transmits event information indicating the event to the laptop computer 6a in a similar manner to an event caused by a user operation of inputting with an input device, such as a mouse and a keyboard. In substantially the same manner, the videoconference terminal (teleconference terminal) 7a is connected to the display apparatus 2a via a cable 10a2 for communication in compliance with the above-described standard. Alternatively, the laptop computer 6a and the videoconference terminal 7a may communicate with the display apparatus 2a through wireless communication in compliance with various kinds of wireless communication protocols such as BLUETOOTH.

At another site where the display apparatus 2b is provided, in a similar manner to the above, the display apparatus 2b including the display 3b (screen), the electronic pen 4b, the USB memory 5b, the laptop computer 6b, the videoconference terminal 7b, a cable 10b1, and a cable 10b2 are used. In addition, an image displayed on the display 3b can be changed according to an event caused by a user operation using a hand Hb of a user, for example.

With this configuration, an image drawn on the display 3a of the display apparatus 2a at a first site is also displayed on the display 3b of the display apparatus 2b at a second site. Conversely, an image drawn on the display 3b of the display apparatus 2b at the second site is displayed on the display 3a of the display apparatus 2a at the first site. Since the communication system 1 performs processing for sharing the same image between remotely located sites in this manner, the communication system 1 is useful when used in a conference (meeting) held among participants located at remote sites.

In the following, the "display apparatus 2" refers to any one of the plurality of display apparatuses 2 (e.g., 2a and 2b). Similarly, the "display 3" refers to any one of the plurality of displays 3 (e.g., 3a and 3b). The "electronic pen 4" refers to any one of the plurality of electronic pens 4 (e.g., 4a and 4b). The "USB memory 5" refers to any one of the plurality of USB memories 5 (e.g., 5a and 5b). The "laptop computer 6" refers to any one of the plurality of laptop computers 6 (e.g., 6a and 6b). The "videoconference terminal 7" refers to any one of the plurality of videoconference terminals 7 (e.g., 7a and 7b). The "hand H" refers to any one of the plurality of the user's hands H (e.g., Ha and Hb). The "cable 10" refers to any one of the plurality of cables 10 (e.g., 10a and 10b).

In the present embodiment, an electronic whiteboard is described as one example of the display apparatus 2, but the display apparatus 2 is not limited thereto. Other examples of the display apparatus 2 include an electronic signboard (digital signage), a telestrator that is used, for example, in sports and weather broadcasts, and a remote image (video) diagnostic apparatus. The laptop computer 6 is an example of an external device, but the external device may be any communication terminal that supplies image frames. Examples thereof include a desktop PC, a tablet PC, a personal data assistance (PDA), a digital video camera, a digital camera, and a game console. Further, the communication network includes, for example, the Internet, a local area network (LAN), and a mobile communication network. In the present embodiment, the USB memory 5 is described as one example of a recording medium, but the recording medium may be any desired recording medium, such as a secure digital (SD) card.

Hardware Configuration of Display Apparatus

Figure 3:
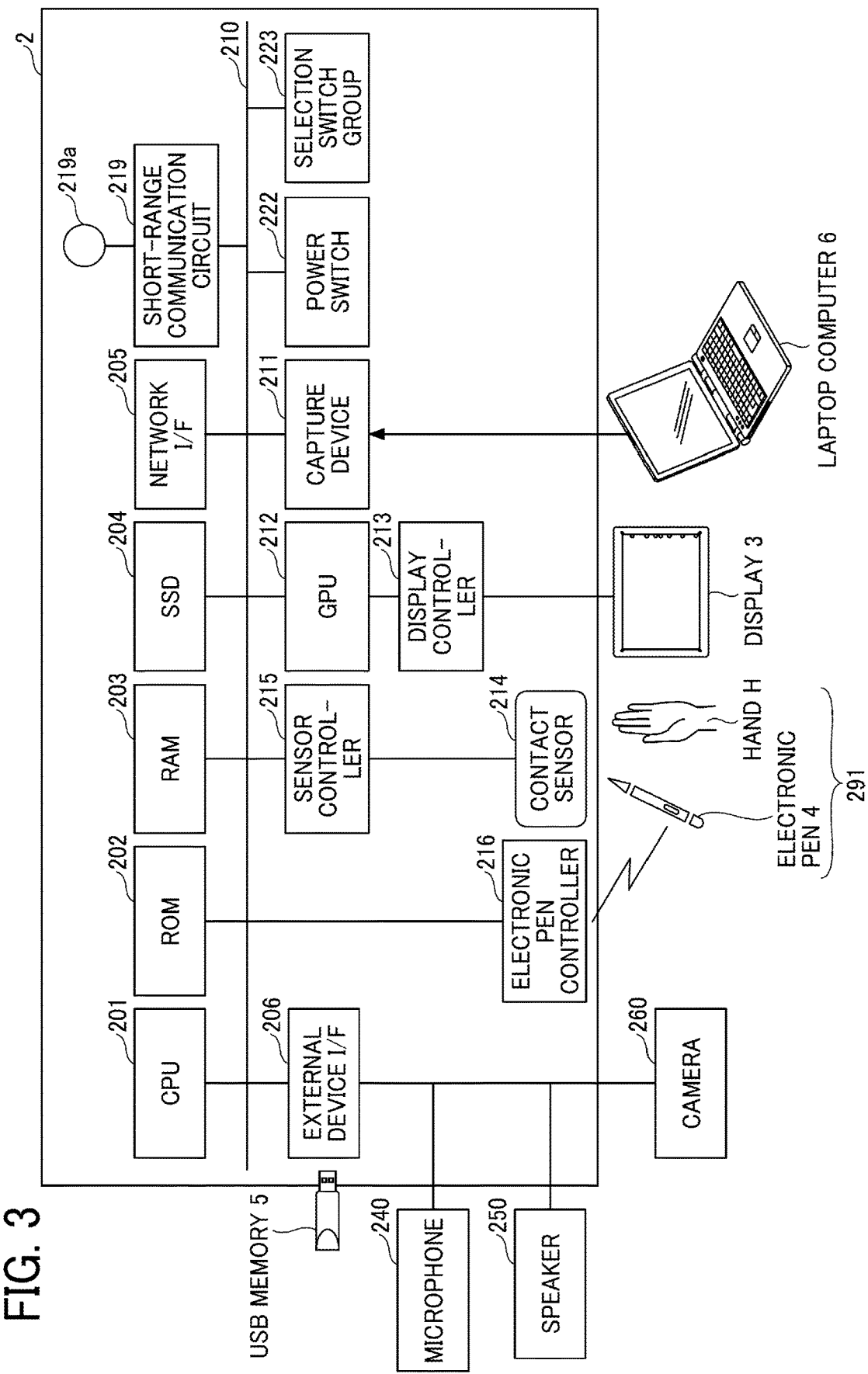
FIG. 3 is a block diagram illustrating a hardware configuration of a display apparatus according to embodiments.

A description is given of a hardware configuration of the display apparatus 2 according to a first embodiment, with reference to FIG. 3. FIG. 3 is a diagram illustrating an example of the hardware configuration of the display apparatus 2 according to the present embodiment. As illustrated in FIG. 3, the display apparatus 2 includes a central processing unit (CPU) 201, a read only memory (ROM) 202, a random access memory (RAM) 203, a solid state drive (SSD) 204, a network interface (I/F) 205, and an external device I/F 206.

The CPU 201 controls the entire operation of the display apparatus 2. The ROM 202 stores a control program such as an initial program loader (IPL) to boot the CPU 201. The RAM 203 is used as a work area for the CPU 201.

The SSD 204 stores various data such as an operating system (OS) and a control program for the display apparatus 2. This program may be an application program that runs on an information processing apparatus equipped with a general-purpose operating system (OS) such as WINDOWS, MAC OS, ANDROID, and IOS. In this case, the display apparatus 2 is usually used as a general-purpose information processing apparatus. However, when a user executes an application program, the display apparatus 2 receives handwriting or the like performed by the user similar to a dedicated display apparatus.

The network I/F 205 controls communication with an external device via the communication network 9. The external device I/F 206 is an interface for connecting to various external devices. Examples of the external devices in this case include, but not limited to, the USB memory 5 and externally-connected devices such as a microphone 240, a speaker 250, and a camera 260.

The display apparatus 2 further includes a capture device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and a selection switch group 223.

The capture device 211 causes a display of the laptop computer 6 to display video (image) information as a still image or a moving image. The GPU 212 is a semiconductor chip dedicated to graphics. The display controller 213 controls screen display for outputting an image processed by the GPU 212 to the display 3. The contact sensor 214 detects a touch of the electronic pen 4 or the user's hand H onto the display 3. The sensor controller 215 controls the operation of the contact sensor 214. The contact sensor 214 inputs and detects coordinates by an infrared blocking system. The inputting and detecting of coordinates may be as follows. For example, two light receiving and emitting devices are disposed at both ends of the upper face of the display 3, and a reflector frame surrounds the periphery of the display 3. The light receiving and emitting devices emit a plurality of infrared rays in parallel to a surface of the display 3. The rays are reflected by the reflector frame, and a light-receiving element receives light returning through the same optical path of the emitted infrared rays. The contact sensor 214 outputs an identifier (ID) of the infrared ray that is blocked by an object after being emitted from the two light receiving and emitting devices, to the sensor controller 215. Based on the ID of the infrared ray, the sensor controller 215 detects specific coordinates of the position touched by the object. The electronic pen controller 216 communicates with the electronic pen 4 to detect a touch on the display 3 by the tip or bottom of the electronic pen 4. The short-range communication circuit 219 is a communication circuit that is compliant with Near Field Communication (NFC), BLUETOOTH, or the like. The power switch 222 turns on or off the power of the display apparatus 2. The selection switch group 223 is a group of switches for adjusting brightness, hue, etc., of displaying on the display 3.

The display apparatus 2 further includes a bus line 210. The bus line 210 is an address bus or a data bus that electrically connects the elements illustrated in FIG. 3, such as the CPU 201, to each other.

The contact sensor 214 is not limited to a sensor using the infrared blocking system, but may be, for example, a capacitive touch panel that identifies a contact position by detecting a change in capacitance. Alternatively, the contact sensor 214 may be a resistive film touch panel that identifies a contact position by a change in voltage of two opposing resistive films. The contact sensor 214 may be an electromagnetic inductive touch panel that detects electromagnetic induction generated by a touch of an object onto a display to determine the touched position. The electronic pen controller 216 may determine whether there is a touch of another part of the electronic pen 4 such as a part thereof held by the user as well as the tip and the bottom of the electronic pen 4.

Functions

Figure 4:
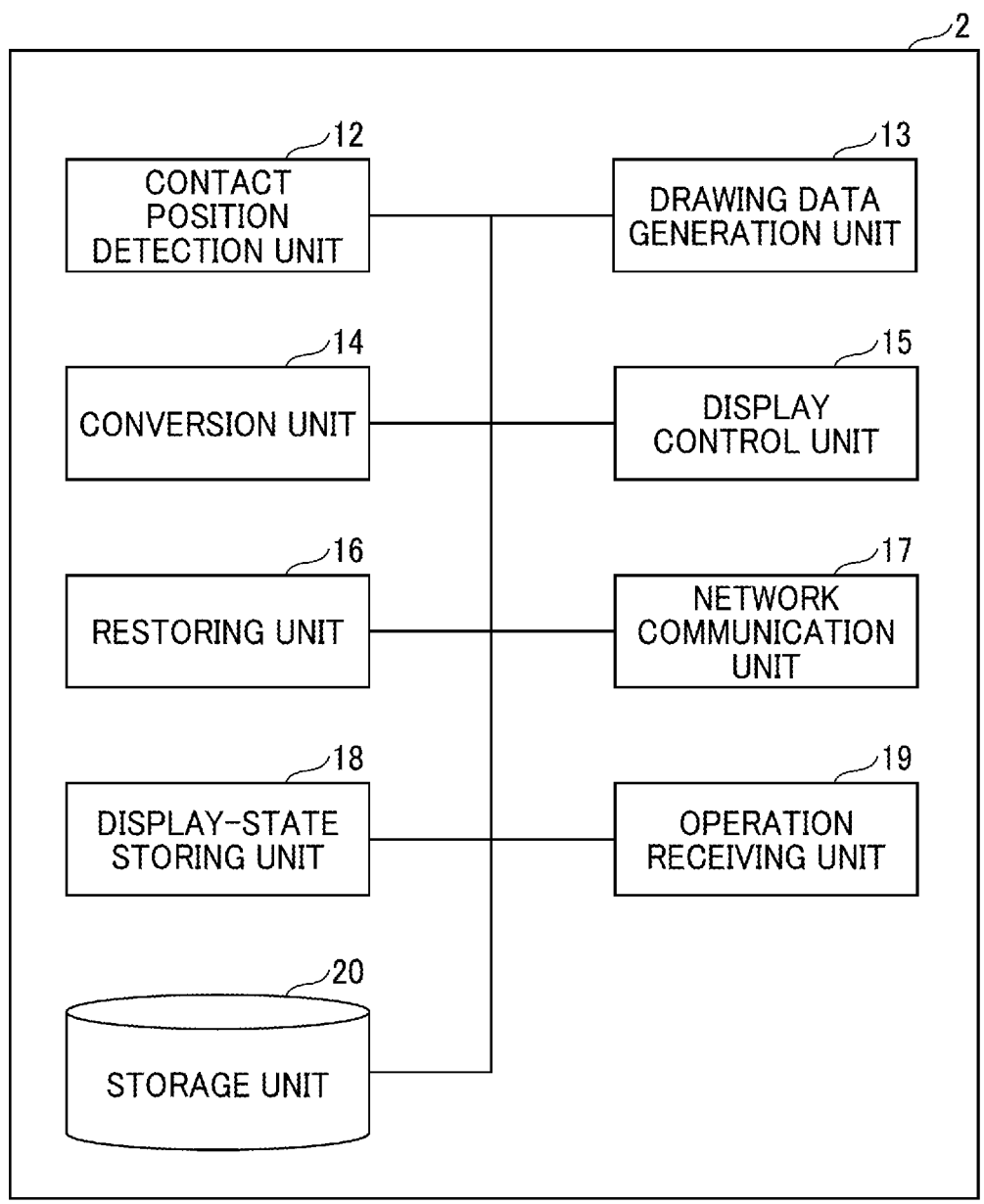
FIG. 4 is a block diagram illustrating a functional configuration of the display apparatus according to a first embodiment.

FIG. 4 is a block diagram illustrating an example of a functional configuration of the display apparatus 2 according to the present embodiment. The display apparatus 2 illustrated in FIG. 4 includes a contact position detection unit 12, a drawing data generation unit 13, a conversion unit 14, a display control unit 15, a restoring unit 16, a network communication unit 17, a display-state storing unit 18, an operation receiving unit 19, and a storage unit 20.

The functional units of the display apparatus 2 are implemented by or are caused to function by one or more of the elements illustrated in FIG. 3 operating according to instructions from the CPU 201 executing an application program loaded to the RAM 203.

The contact position detection unit 12 detects the coordinates of a position on the touch panel touched by the input device 291 (e.g., a finger or an electronic pen). The contact position detection unit 12 determines that the electronic pen 4 has touched when the number (width in which light is blocked) of phototransistors that do not detect light is equal to or less than a threshold number, and determines that another object (for example, a finger) has touched when the number of the phototransistors is greater than the threshold number.

The drawing data generation unit 13 generates stroke data by interpolate the coordinate point sequence detected by the contact position detection unit 12 when the user performs hand drafted input.

The conversion unit 14 performs character recognition on the hand drafted data and converts the hand drafted data into text. The text includes characters, numerals, alphabets, symbols, and shapes such as a triangle and a square.

The display control unit 15 controls displaying, on the display 3, objects such as hand drafted data, text, a window of an application, and a captured image of a PC. The display control unit 15 also displays a menu or the like operated by the user.

The network communication unit 17 connects the network I/F 205 to a network such as a LAN or the Internet, and transmits and receives data to and from other display apparatuses 2 or a PC via the network.

Each time a condition is satisfied (in other words, at predetermined intervals), the display-state storing unit 18 individually stores display state data for restoring an object being displayed in the storage unit 20. The condition is, for example, whether a set time has elapsed or a set number of operations are received, which will be described in detail later.

The restoring unit 16 restores the display state at a certain time point on the display 3 based on the display state data at that time point stored in the storage unit 20. The predetermined interval is, for example, for each set time or each time a set number of operations are performed. The display state data may be stored by an operation of the user or may be stored irregularly.

The operation receiving unit 19 receives various operations performed to the display apparatus 2. For example, the operation receiving unit 19 receives the selection of the thumbnail 101 representing the display state.

Data Stored in Storage Unit

Figure 5:
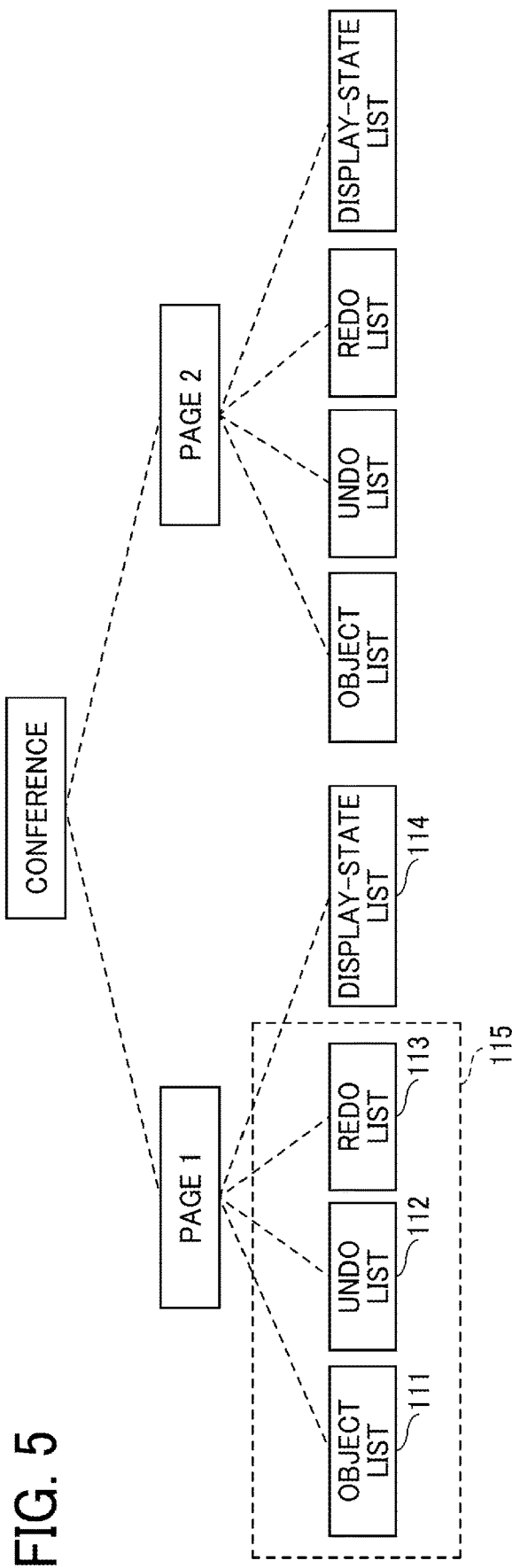
FIG. 5 is a diagram illustrating a data structure of various data managed by the display apparatus according to the first embodiment.
Figure 6:
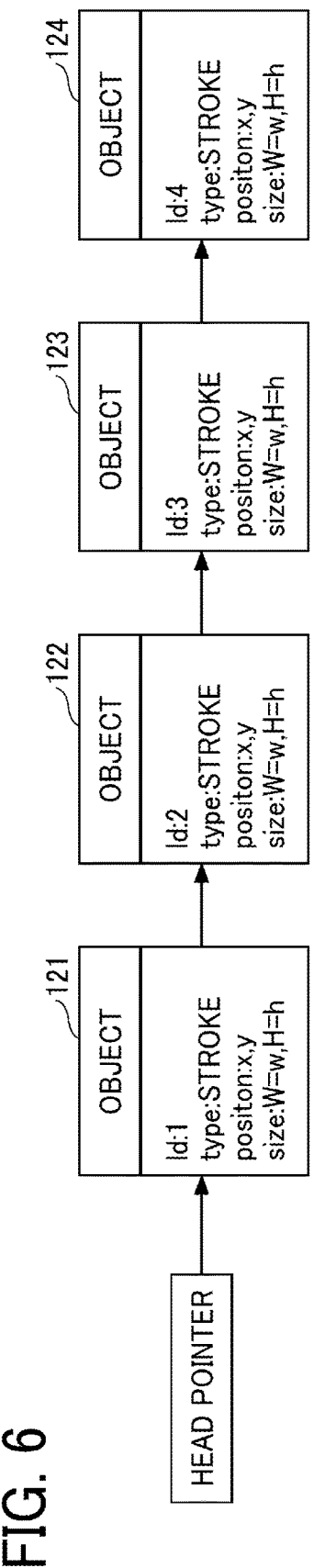
FIG. 6 is a diagram illustrating an example of a data structure of an object list.
Figure 7:
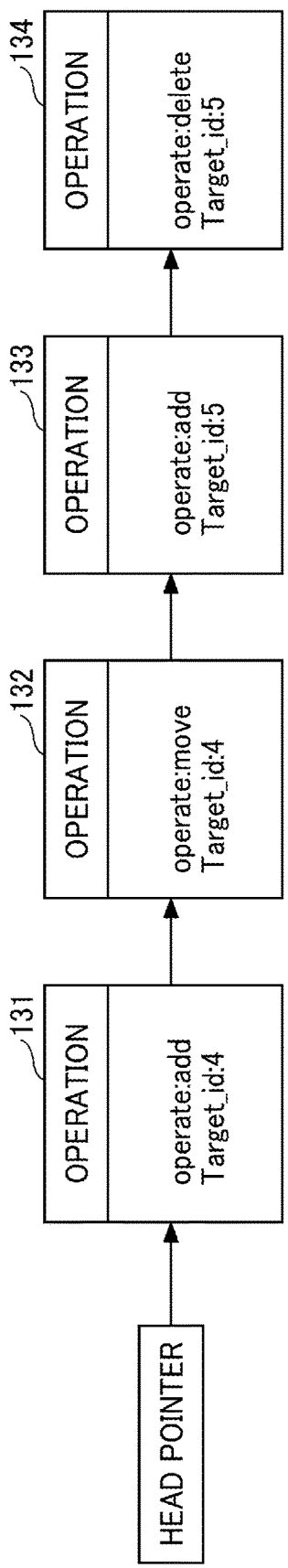
FIG. 7 is a diagram illustrating an example of a data structure of an undo list and a redo list.

Next, a description is given of various data stored in the storage unit 20, with reference to FIGS. 5 to 7. FIG. 5 illustrates a data structure of various data managed by the display apparatus 2. The display apparatus 2 manages display state data for each conference. The conference refers to a period from power-on of the display apparatus 2 (or recovery from the energy saving mode) to power-off or transition to the energy saving mode. The management of display state data may be performed, instead of a unit of one conference, a period of time divided according to designation by the user.

Various data stored in the storage unit 20 is managed for each page. Each page includes an object list 111, an undo list 112, a redo list 113, and a display-state list 114. A page is one planar display range. The page may be the same size as the display, or the display may be larger or smaller than the page.

The object list 111 is a list in which object data is stored in time series for each object. The object data is data for displaying an object and includes the type of the object (stroke, text, stamp, etc.), the size of the object (width and height), the position information of the object (top, left, right, or bottom).

The undo list 112 is a list in which past operations are stored in time series as an operation history.

The redo list 113 is a list in which operation cancellation records are stored in time series as a history of operations.

The object list 111, the undo list 112, and the redo list 113 represent a current display state 115. With the object list 111, the display apparatus 2 can restore the display state at a certain time point.

The display-state list 114 is a list in which display state data to be described later is stored in time series. The details will be described with reference to FIG. 8.

FIG. 6 illustrates a data structure of the object list 111. The object list 111 is a list of object data 121 to 124 included in one page. As illustrated in FIG. 6, the object list 111 is a linear list. A linear list is a list in which elements called nodes containing data and pointers are connected by pointers. Accordingly, the order in which the objects were input is also recorded. Items included in the object data are as follows.

"Id" refers to identification information of the object.

"Type" refers to the type of the object.

"Position" refers to position information indicating the position of the object. The position information is, for example, the coordinates of any one of four vertices of a circumscribed rectangle of the object.

"Size" refers to the size (height and width) of the object.

FIG. 7 illustrates a data structure common to the undo list 112 and the redo list 113. The undo list 112 is a list of operation records 131 to 134 included in the page. That is, the undo list 112 represents a history of past operations. The redo list 113 is a history of operation cancellations included in the page, but has the same data structure as the undo list 112. As illustrated in FIG. 7, the undo list 112 and the redo list 113 are linear lists. Items included in the undo list 112 and the redo list 113 are as follows.

"Operation" refers to an operation content.

Target_id is the identifier of the object on which an operation is performed.

By referring to and processing these pieces of information, the display apparatus 2 stores the display state of the display apparatus 2 and executes an undo/redo operation. For example, since the operation content of the operation record 134 in FIG. 7 is to "delete" the object having a Target_id "5." Accordingly, when the user performs the undo operation, the display apparatus 2 again displays the deleted object having the Target_id "5." The object having the Target_id "5" is included in the object list 111. The operation record 134 is removed from the undo list 112, and the operation record 134 is added to the redo list 113 as an operation cancellation record.

In addition, since the operation content of the second operation record 133 from the right in FIG. 7 is to "add" the object having the Target_id "5," when the user performs the undo operation, the display apparatus 2 hides the added object having the Target_id "5." The operation record 133 is removed from the undo list 112, and the operation record 133 is added to the redo list 113 as an operation cancellation record.

In this state, when the user performs the redo operation, the display apparatus 2 re-executes the addition of the object having the Target_id "5" based on the latest operation cancellation record (the operation record 133) in the redo list 113, and displays the object having the Target_id "5." This operation cancellation record (the operation record 133) is removed from the redo list 113, and the operation record 133 is added to the undo list 112.

Storing Display State Data

Figure 8:
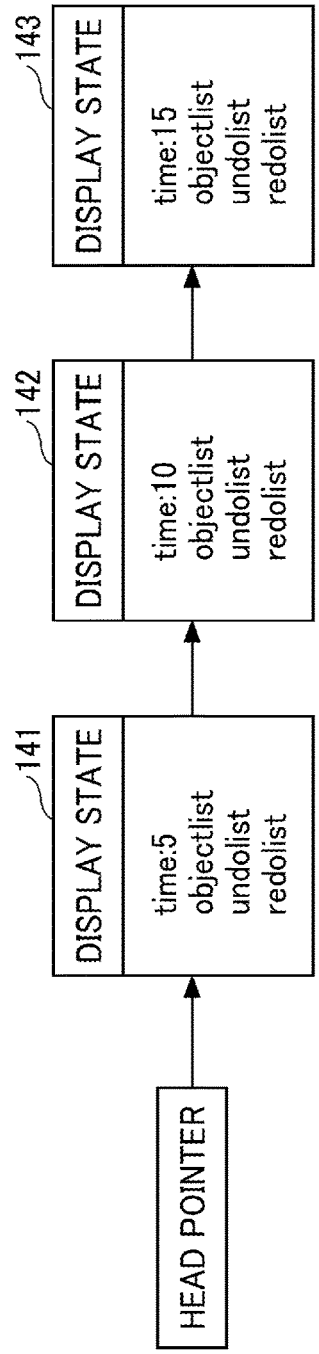
FIG. 8 is a diagram illustrating an example of a data structure of a display-state list.

Next, the display-state list 114 will be described with reference to FIG. 8. FIG. 8 is a diagram illustrating a data structure of the display-state list 114. The display-state list 114 is a list of display state data 141 to 143 representing display states stored at set intervals (for each set time or each set number of operations). The display state data is data for restoring a display state at a certain time point. Each of the display state data 141 to 143 has the following items.

"Time" refers to the time at which the display state data is stored. The time may be an absolute time or an elapsed time from power-on or recovery from the energy saving mode.

"Objectlist" refers to the object list 111 at a certain time point (at the "time" mentioned above).

"Undolist" refers to the undo list 112 at a certain time point (at the "time" mentioned above). The undo list 112 included in the display state data enables redoing operations one by one after the display state at a certain time point is restored.

"Redolist" refers to the redo list 113 at a certain time point (at the "time" mentioned above). The redo list 113 included in the display state data enables redoing operations one by one after the display state at a certain time point is restored.

The display-state storing unit 18 uses a timer to add display state data representing a current display state to the display-state list 114 at the set time intervals. In the case where the predetermined interval is the set number of operations, the display-state storing unit 18 uses a counter that stores the number of operations, and adds display state data representing the current display state to the display-state list 114 each time the number of operations exceeds the set number (at this time, the counter is initialized).

Regarding the object list 111, since the past objects are stored in time series, the display state data 142 at the time "10" redundantly includes the data of the display state data 141 at the time "5." The display state data 143 at the time "15" redundantly includes the data of the display state data 141 at the time "5" and the display state data 142 at the time "10." The same applies to the undo list 112. The redo list 113 stores, as the operation cancellation records, the operation contents after the display state data is stored. The details will be described with reference to FIG. 10.

Note that the operation to be counted is an operation that causes a change to the object list 111, such as the addition, movement, or deletion of a stroke.

Stored Image of Display State Data

Figure 9:
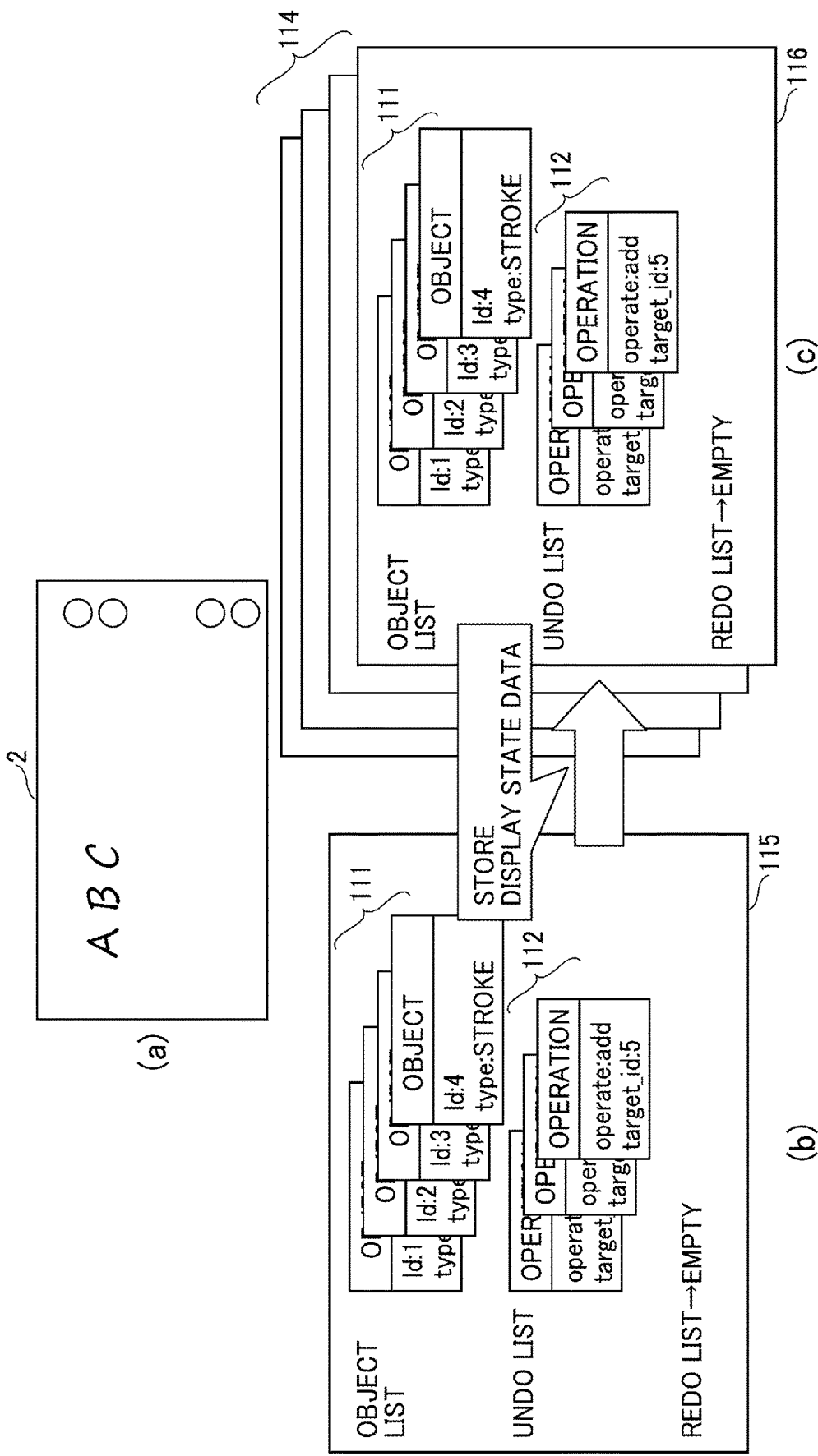
FIG. 9 is a diagram illustrating an example of details of display state data illustrated in FIG. 8, which is stored for each set time or each set number of operations.

FIG. 9 is a diagram illustrating details of the display state data illustrated in FIG. 8, which is stored for each set time or each set number of operations. A part (a) of FIG. 9 is an example of displaying an object at a certain time point. A user has handwritten a text "ABC."

A part (b) of FIG. 9 illustrates the object list 111, the undo list 112, and the redo list 113 (the current display state 115) at the time when the user has handwritten "ABC." The undo list 112 and the redo list 113 are stored in association with the display state data. As described with reference to FIG. 8, the object list 111, the undo list 112, and the redo list 113 represent the current display state 115. To the undo list 112, one operation record is added each time the user inputs one operation. When the user performs an undo operation, the operation record of that undo operation is moved from the undo list 112 to the redo list 113, thereby generating the redo list 113.

In the part (b) of FIG. 9, the redo list 113 is empty on the assumption that the user has performed no undo operation.

The display-state storing unit 18 stores the display state data for each set time or each set number of operations. The display state data is represented by the object list 111, the undo list 112, and the redo list 113 at a certain time point. A part (c) of FIG. 9 illustrates an example of the stored display-state list 114. As illustrated in the part (c) of FIG. 9, the object list 111, the undo list 112, and the redo list 113 at a certain time point in the part (b) of FIG. 9 are saved as is, as one display state data 116. The "display state data 116" is considered as a generic name of, for example, the display state data 141 to 143 illustrated in FIG. 8. Therefore, one display state data 116 includes the object list 111, the undo list 112, and the redo list 113. Note that the display state data 116 also includes the data item "time" described with reference to FIG. 8.

Figure 10:
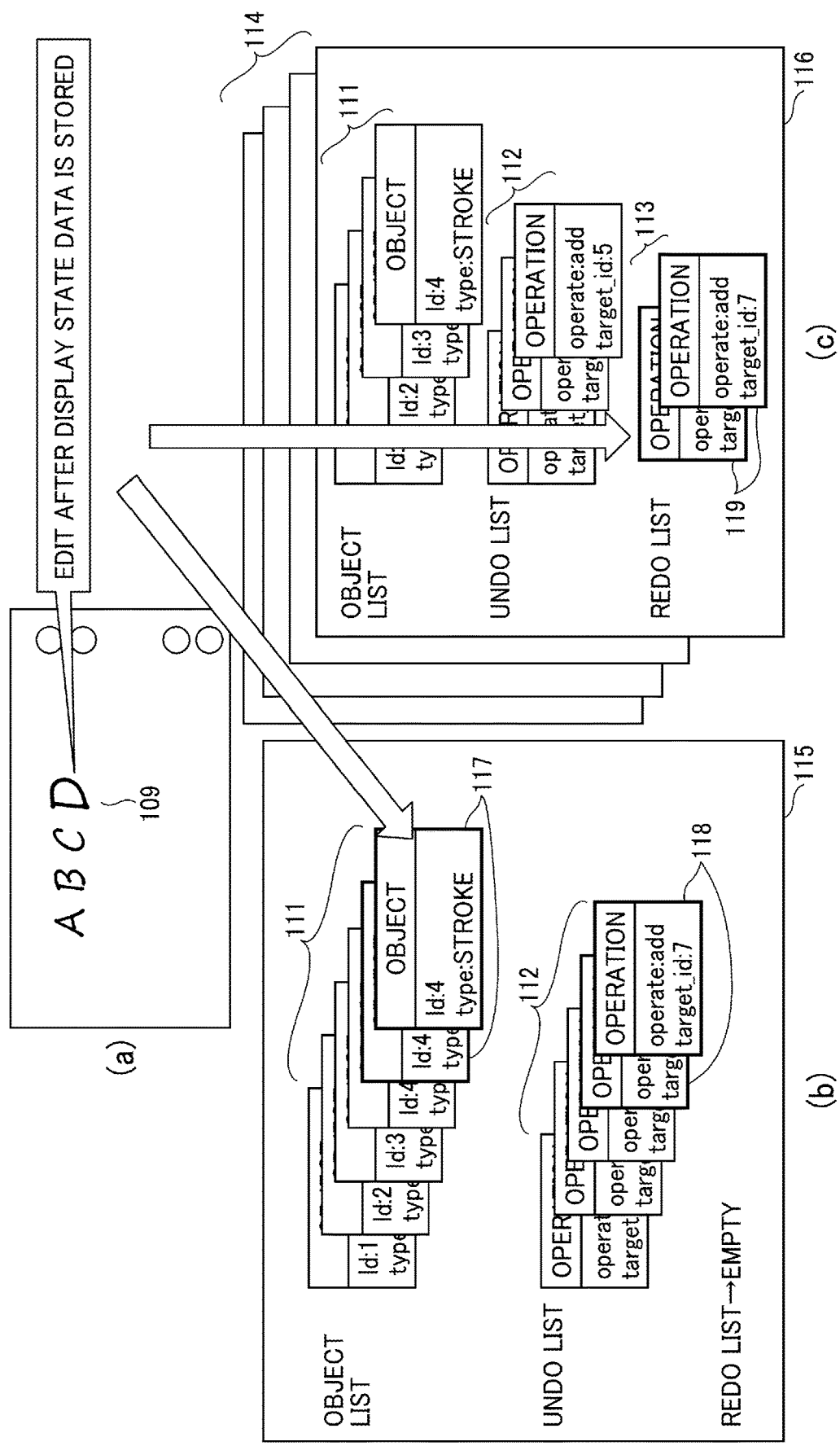
FIG. 10 is a diagram illustrating an example of the redo list after display state data is stored.

Next, updating of the redo list 113 after storing the display state data will be described with reference to FIG. 10. FIG. 10 is a diagram illustrating the redo list 113 after the display state data 116 is stored. After the display-state storing unit 18 stores the display state data 116, when the user edits (for example, adds, moves, or deletes) an object, the operation record is added to the redo list 113 of the latest display state data 116.

As illustrated in a part (a) of FIG. 10, the user has input hand drafted data 109 "D" following "ABC." In display apparatuses, since one stroke is input by one operation, the character "D" having two strokes is input by two operations. A part (b) of FIG. 10 illustrates the object list 111, the undo list 112, and the redo list 113 at the time when "D" is added. As illustrated in the part (b) of FIG. 10, object data 117 corresponding to the added "D" is added to the object list 111, and operation records 118 corresponding to the added "D" is added to the undo list 112. The redo list 113 may be empty.

On the other hand, as illustrated in a part (c) of FIG. 10, operation cancellation records 119 corresponding to the added "D" are added to the stored display state data 116. No object data is added to the object list 111 of the display state data 116, and no operation record is added to the undo list 112. Since the operation record is added only to the undo list 112, when the user selects to return to the display state stored as the display state data 116 in the part (c) of FIG. 9, the user can further return the operation by the undo operation (for example, delete "C") or can advance the operation by the redo operation (for example, display "D").

Process of Storing Display State Data

Figure 11:
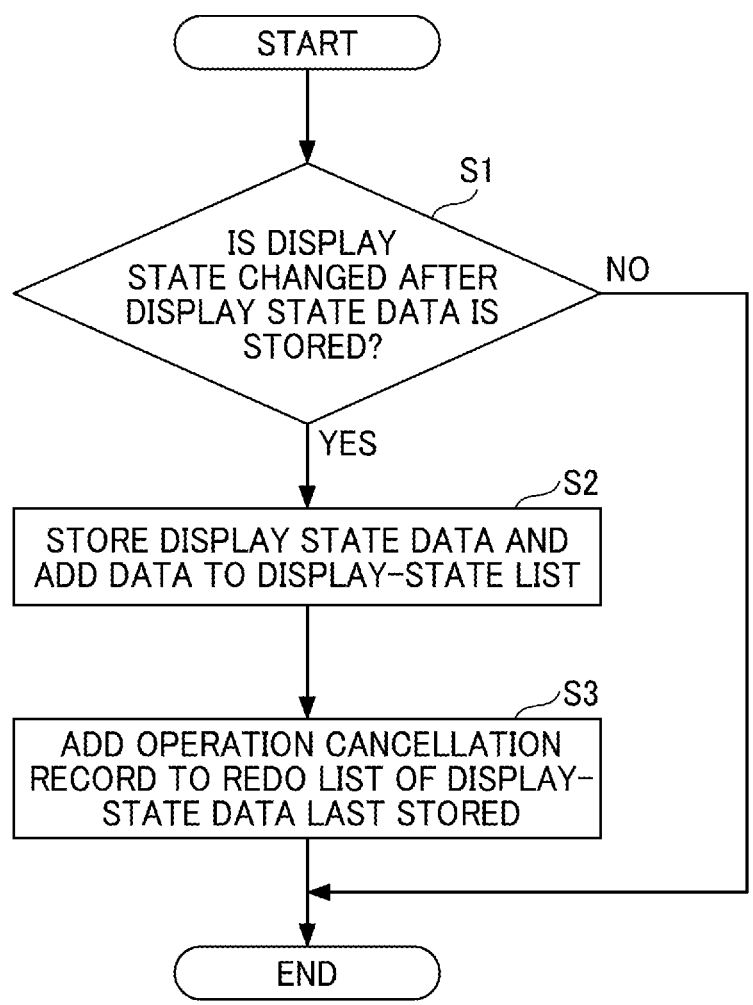
FIG. 11 is a flowchart illustrating a process performed by a display-state storing unit to store display state data for each set time, according to the first embodiment.

FIG. 11 is a flowchart illustrating a process performed by the display-state storing unit 18 to store display state data for each set time. The process of FIG. 11 is executed for each set time, triggered by time-out of the timer.

The display-state storing unit 18 determines whether the display state is changed (there is a change in the object list 111) after the previous storing of the display state data (51). Specifically, for example, the display-state storing unit 18 clears a flag each time the display state data is stored and turns on the flag when the user changes the display state.

When there is a change in the display state (Yes in S1), the display-state storing unit 18 adds, to the display-state list 114, the object list 111, the undo list 112, and the redo list 113 at the current time point as the display state data 116 (S2).

Next, after storing the display state data 116, the display-state storing unit 18 adds an operation cancellation record to the redo list 113 of the last stored display state data each time the user changes the display state (S3).

Figure 12:
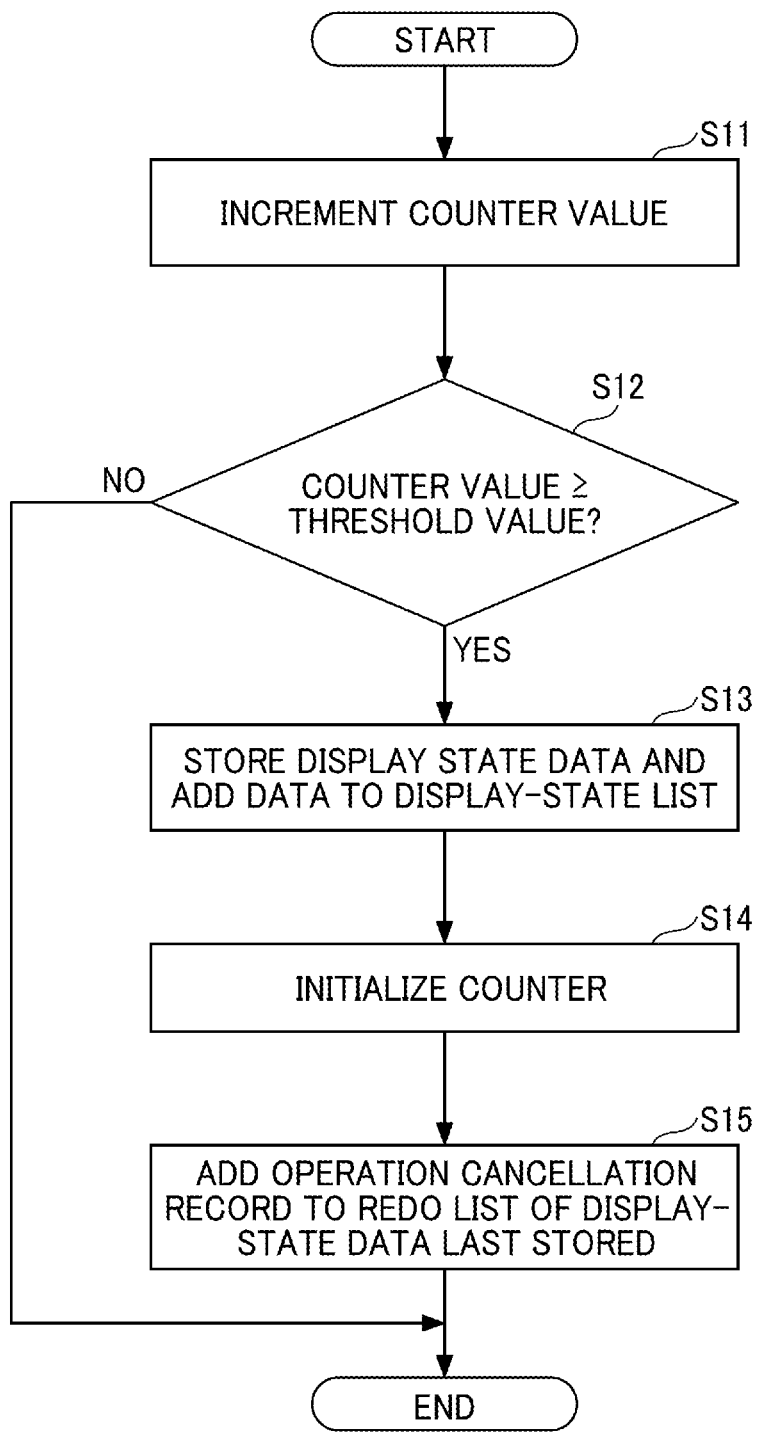
FIG. 12 is a flowchart illustrating a process performed by the display-state storing unit to store display state data for each set number of operations, according to the first embodiment.

FIG. 12 is a flowchart illustrating a process performed by the display-state storing unit 18 to store display state data for each set number of operations. The process of FIG. 12 is executed each time the user changes the display state.

The display-state storing unit 18 increments the count value of the counter by one (S11).

The display-state storing unit 18 determines whether the count value is equal to or greater than a threshold value (the set number of operations) (S12). When the count value is not equal to or greater than the threshold value (the set number of operations) (No in S12), the process of FIG. 12 ends.

When the count value is equal to or greater than the threshold value (Yes in S12), the display-state storing unit 18 adds, to the display-state list 114, the object list 111, the undo list 112, and the redo list 113 at the current time point as the display state data 116 (S13). Since the process of FIG. 12 is executed each time the user changes the display state, the display state data 116 that is stored last is changed.

In addition, the display-state storing unit 18 initializes the counter (S14).

Next, after storing the display state data 116, the display-state storing unit 18 adds an operation cancellation record to the redo list 113 of the last stored display state data 116 each time the user changes the display state (S15).

Example of Set Time and Set Number of Operations

The display apparatus 2 may receive, from the user, the setting of the predetermined interval (the set time or the set number of operations) for storing the display state.

When the frequency of the storing increases, the number of stored display state data is likely to increase. As the frequency of the storing increases, the usage of the memory increases, or the difference from the undo/redo operation is reduced.

Figure 13:
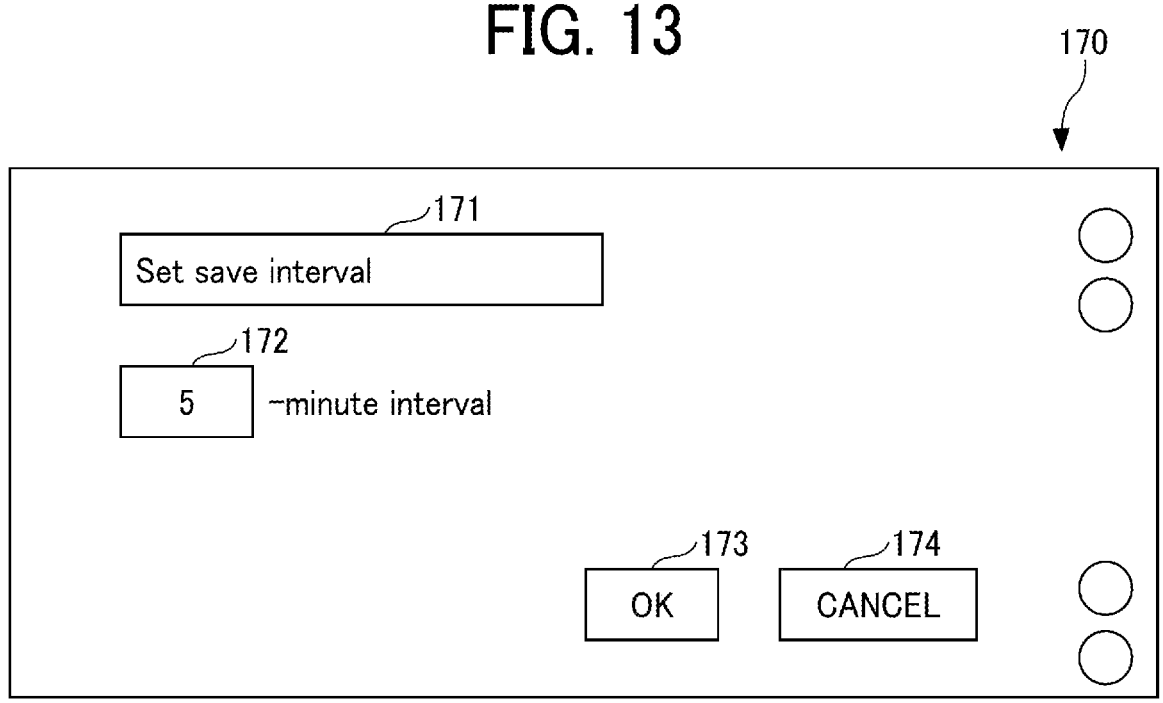
FIG. 13 is a diagram illustrating an example of a save interval setting screen that receives a user's setting of time as the frequency of storing display states.

FIG. 13 is a diagram illustrating a save interval setting screen 170 that receives the user's setting of time as the frequency of storing the display state. The save interval setting screen 170 includes a message 171 "set save interval," a time input field 172, an OK button 173, and a cancel button 174. The time input field 172 is, for example, a pull-down menu, and the user can select a desired storing frequency from the pull-down menu.

Figure 14:
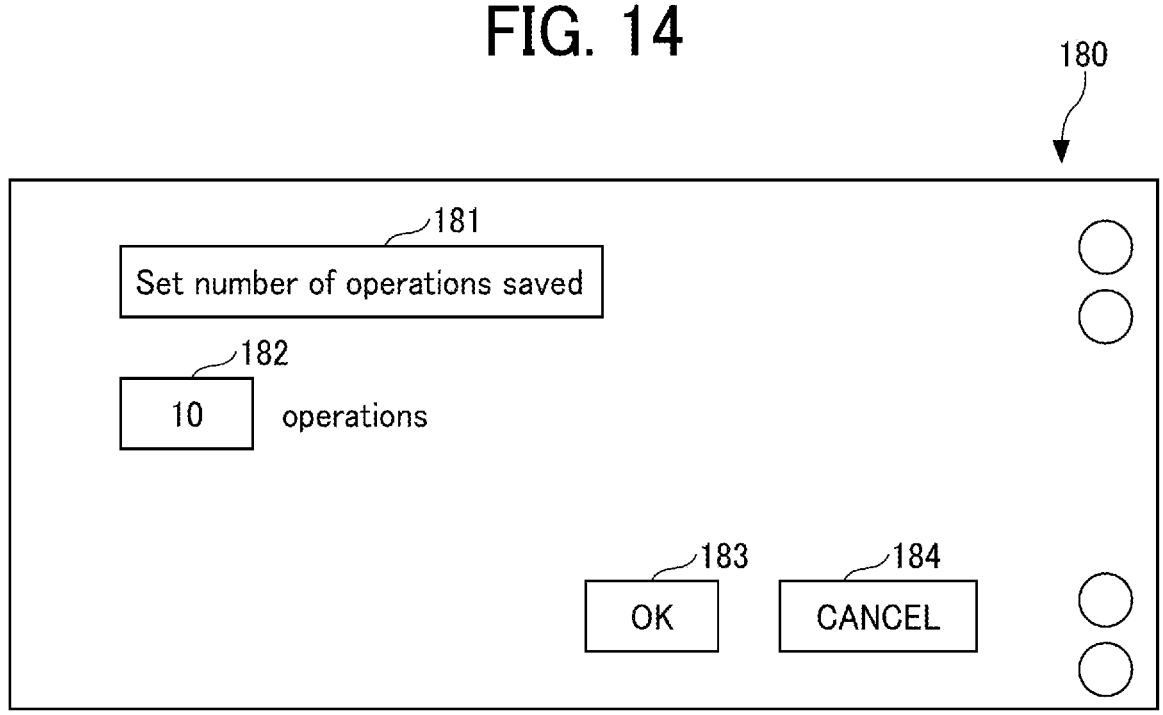
FIG. 14 is a diagram illustrating an example of an operation number setting screen that receives a user's setting of the number of operations as the frequency of storing display states.

FIG. 14 is a diagram illustrating an operation number setting screen 180 that receives the user's setting of the number of operations as the frequency of storing the display state.

The operation number setting screen 180 includes a message 181 "set number of operations saved," an operation number input field 182, an OK button 183, and a cancel button 184. The operation number input field 182 is, for example, a pull-down menu, and the user can select a desired storing frequency from the pull-down menu.

Restoration of Display State of Certain Past by Slider Operation

Figure 15B:
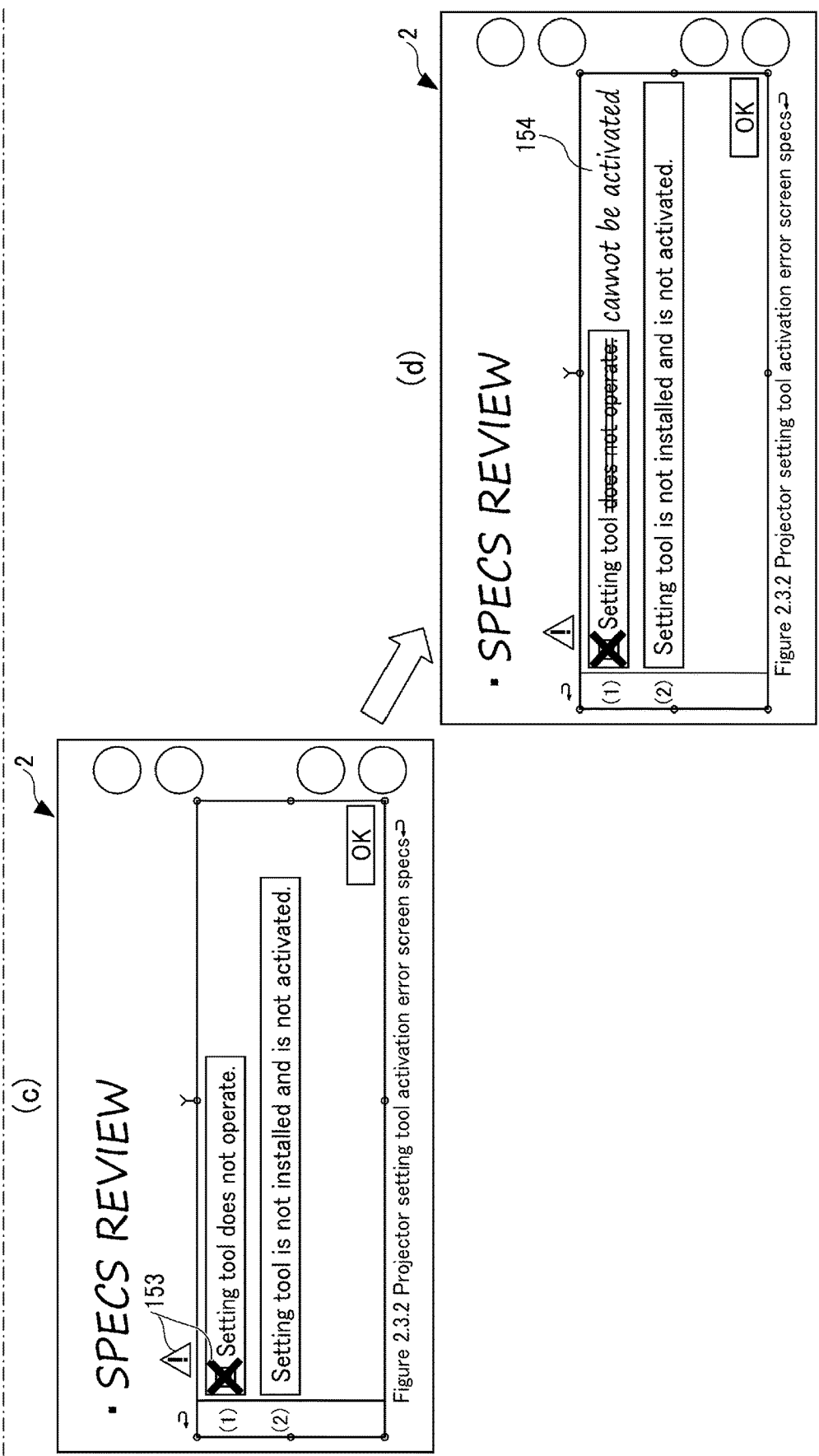

Next, a description is given of a process for restoring a display state at a certain time point, with reference to FIGS. 15A to 17B. FIGS. 15A, 15B, and 15C (FIG. 15) are diagrams illustrating an example of inputting an object by a user and a method for starting the time-series restoration mode (time-series editing mode). Parts (a) to (d) of FIG. 15 illustrate an example of inputting an object by the user. In the parts (a) to (d) of FIG. 15, the user performs inputting hand drafted data 151, an operation of displaying a captured image 152, an operation of displaying a stamp 153, and inputting hand drafted data 154.

The display apparatus 2 has the capability of executing a plurality of applications at the same time. The functions of the display apparatus 2 described in the present embodiment are realized by one application (hereinafter simply referred to as an "application"). In addition, the display apparatus 2 can execute a web browser, a teleconference application, and the like. When a plurality of applications is executed, windows of other applications are displayed on the display.

FIG. 16 illustrates a window 160 of another application displayed on the display apparatus 2 (more specifically, the display 3 thereof). In FIG. 16, an object 161 and the window 160 are displayed on the display 3. The display-state storing unit 18 can include the window 160 (image data) of the other application and the display position (coordinates) thereof in the information stored in the display state data. Therefore, when the display state is restored, the display apparatus 2 can restore the window 160 of the other application. The display-state storing unit 18 can acquire a window of another application from the OS.

Figure 17B:
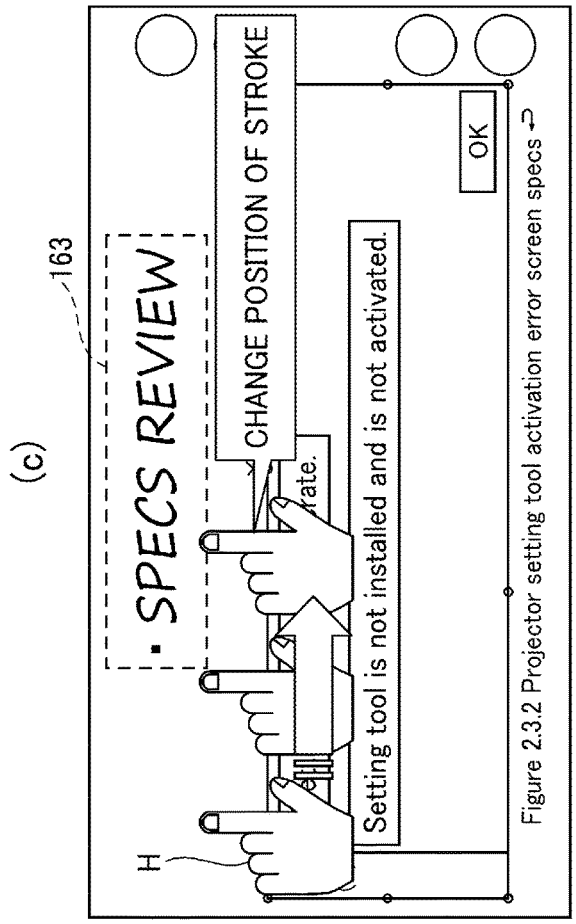

Referring back to FIG. 15, the description is continued. The user has pressed a button 150 for time-series restoration mode illustrated in a part (e) of FIG. 15 in order to return to the display state at a certain past time point. The display apparatus 2 transitions to the time-series restoration mode as illustrated in FIGS. 17A and 17B (FIG. 17). Parts (a) and (b) of FIG. 17 are substantially the same as FIGS. 1A and 1B and presented again for the sake of explanation.

The part (a) of FIG. 17 illustrates an example of a screen in the time-series restoration mode. In the time-series restoration mode, the thumbnails 101 representing the display states at different past time points are displayed linearly (or on a straight line) to be slid. The thumbnail 101 is an image obtained by reducing the display state restored based on the object list 111 in the display state data 116 (see FIG. 10). When the user touches the thumbnail 101 with a finger or the electronic pen 4 (examples of input device) and slides the thumbnail 101 to the left or the right (an example of instruction operation), the thumbnail 101 representing a previous display state or a more recent display state is displayed according to the direction of the sliding operation. When the user presses the thumbnail 101 with a finger or the electronic pen 4 (an example of instruction operation), the display state corresponding to the pressed thumbnail 101 is selected.

When the user selects a desired display state, as illustrated in the part (b) of FIG. 17, the display apparatus 2 displays the object displayed in the selected display state. This object is displayed on the screen after the restoring unit 16 acquires the object list 111 in the display state data corresponding to the selected display state. The details of the restoration process will be described with reference to FIGS. 19 and 20.

The restored display state is displayed not as image data but in the state of an object. The state of an object means that, when the object is a stroke, the object is displayed based on a coordinate point sequence. In a part (c) of FIG. 17, by using this feature, the display apparatus 2 moves an object 163 according to swiping of the object 163 by the hand H (or a finger) of the user.

As described above, when the user selects the display state data and the display apparatus 2 restores the display state, not the image data but the original object is displayed. Therefore, the user can re-edit (for example, move or delete) the object and undo or redo the editing in units of operations.

In addition, as illustrated in FIG. 10, since the undo list 112 and the redo list 113 are stored in the display state data, the user can undo or redo the editing in units of operations.

In other words, after restoring the display state in units of set time intervals or a set number of operations, the user can undo or redo one editing operation at a time by the conventional undo or redo operation.

Figure 18:
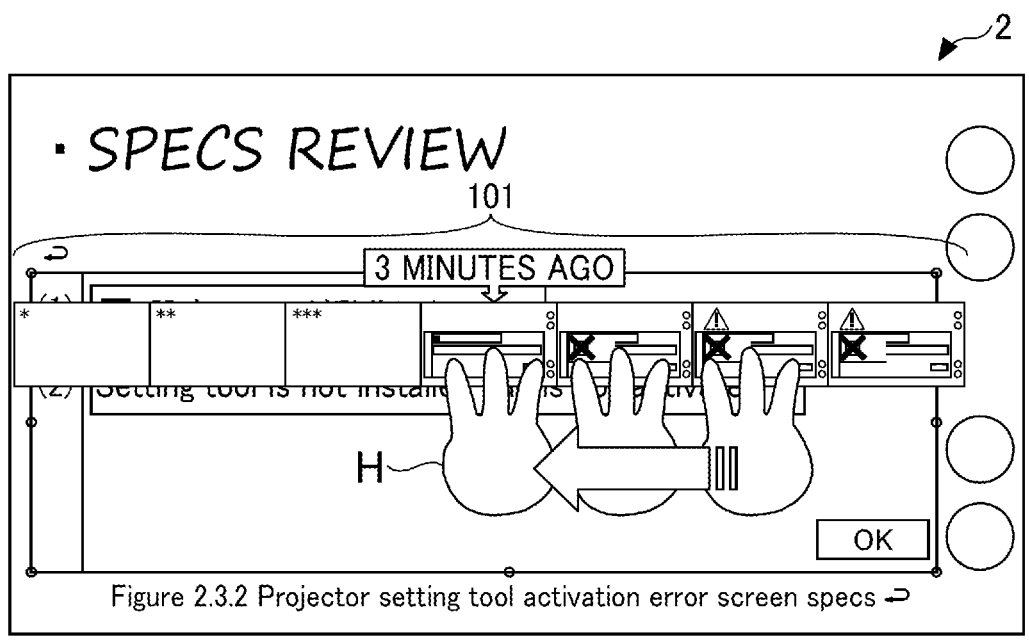
FIG. 18 is a diagram illustrating a method of selecting a thumbnail according to a gesture operation according to embodiments.

Further, as illustrated in FIG. 18, the display apparatus 2 allows the user to slide the thumbnail 101 representing the display states to the left or the right by a gesture operation. FIG. 18 is a diagram illustrating a method of selecting a thumbnail according to a gesture operation. For the gesture operation, the operation contents are individually assigned to the number of fingers touching the screen. The gesture operation is for the display apparatus 2 to receive an instruction of an operation content assigned to the number of fingers touching the screen. In the description referring to FIG. 18, it is assumed that the transition to the time-series restoration mode is assigned to a three-finger operation. The number of fingers for the gesture operation may be one, two, or four or more.

Therefore, when the user touches an arbitrary position on the screen with three fingers, the display apparatus 2 transitions to the time-series restoration mode. The display apparatus 2 slidably displays the linearly arranged thumbnails 101 representing the display states at different past time points. When the user slides the thumbnails 101 to the left or the right with three fingers, the thumbnail 101 corresponding to the past or more recent display state is displayed according to the direction of the sliding operation. When the user presses the thumbnail 101 with a finger or the electronic pen 4, the display state corresponding to the pressed thumbnail 101 is selected.

As described above, in the gesture operation, the user does not need to press the button 150 for time-series restoration mode in order to execute the time-series restoration mode. Instead of selecting the thumbnail 101 in response to the user's pressing the thumbnail 101 with the finger or the electronic pen 4, the display apparatus 2 may select the thumbnail 101 that is pressed immediately before the finger or the electronic pen 4 is d from the thumbnail 101, in response to the releasing.

When the user uses the electronic pen 4, the display apparatus 2 can transition to the time-series restoration mode receiving touch with the bottom of the electronic pen 4, holding-down of the tip of the electronic pen 4, or pressing of a button provided on the electronic pen 4.

Restoration of Display State

Figure 19:
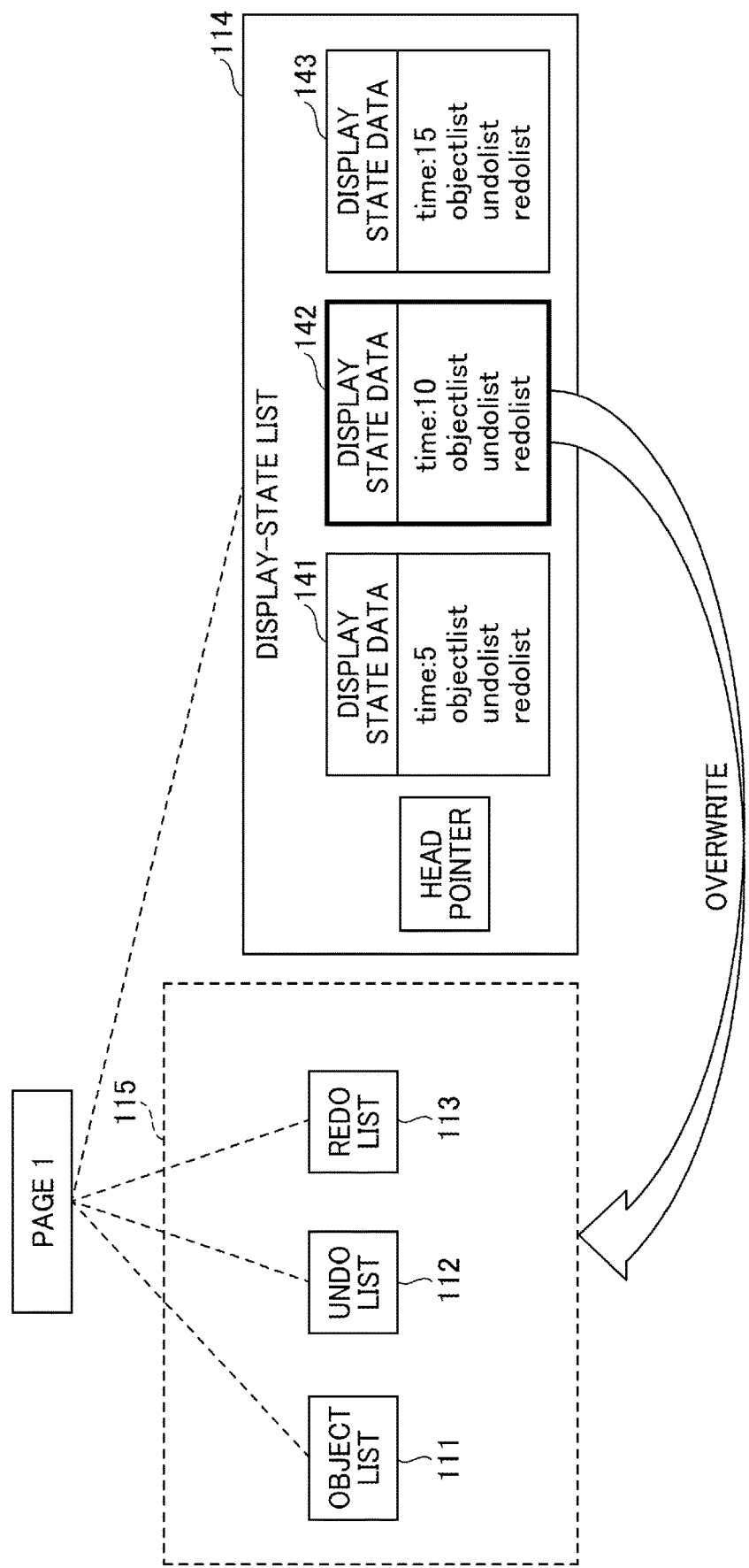
FIG. 19 is a diagram illustrating a process performed by a restoring unit to restore a past display state to a current page, using display state data according to the first embodiment.

FIG. 19 is a diagram illustrating a process performed by the restoring unit 16 to restore the past display state to the current page, using the display state data. FIG. 19 illustrates an example of restoring a display state at a certain past time point on the current page. The display apparatus 2 holds the current display state 115 (the object list 111, the undo list 112, and the redo list 113) at a predetermined address (a memory area) of the RAM 203.

In the time-series restoration mode, the user slides the thumbnails 101 laterally to select a display state to be restored. The restoring unit 16 determines the corresponding display state data 116 (the display state data 142 in FIG. 19) in the display-state list 114.

The restoring unit 16 overwrites the object list 111, the undo list 112, and the redo list 113 of the current display state with the determined display state data. Specifically, the restoring unit 16 overwrites the object list 111 of the current display state 115 with the object list 111 of the selected display state data, overwrites the undo list 112 of the current display state 115 with the undo list 112 of the selected display state, and overwrites the redo list 113 of the current display state 115 with the redo list 113 of the selected display state.

In this way, the restoring unit 16 restores the past display state while a certain page is displayed.

Figure 20:
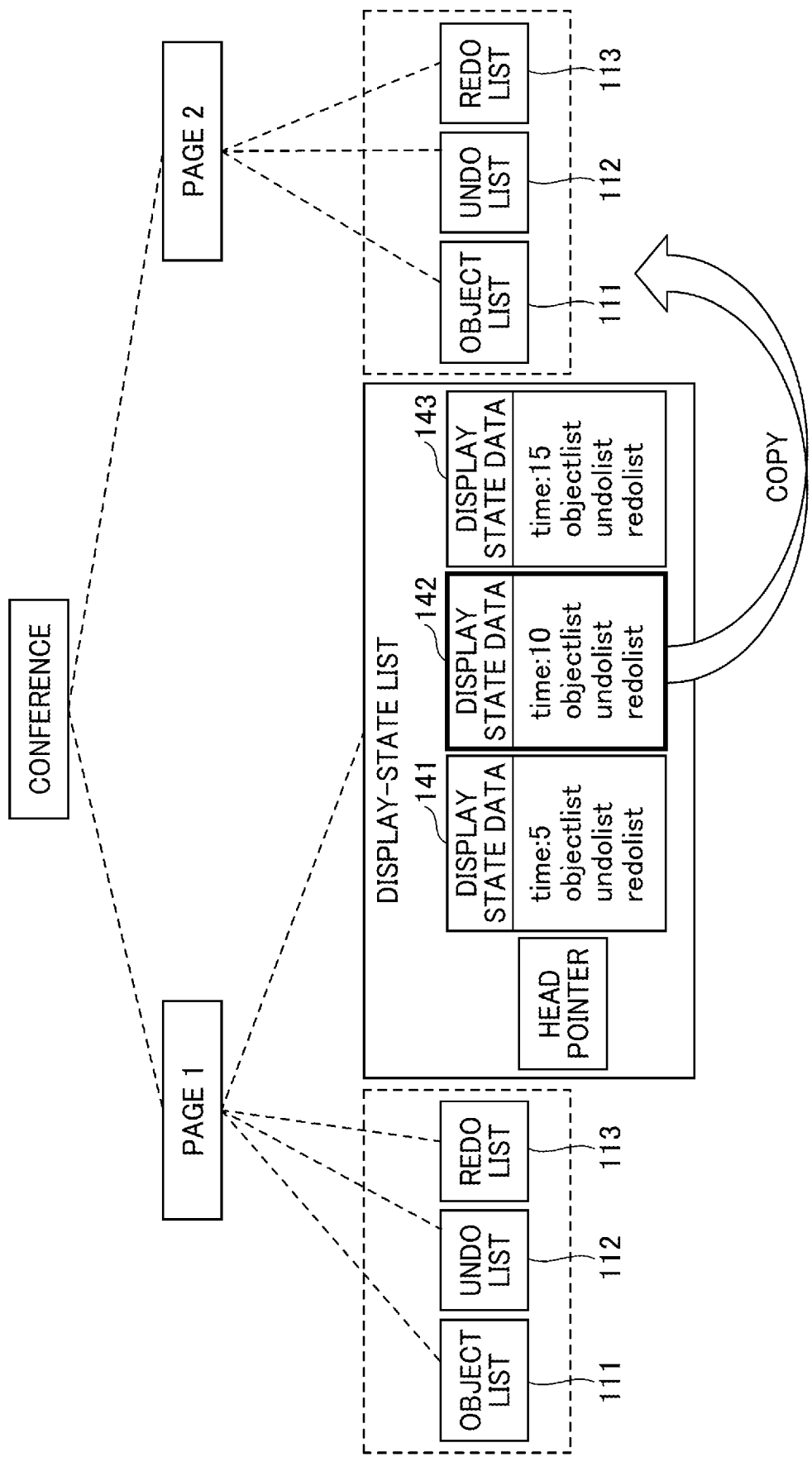
FIG. 20 is a diagram illustrating a process performed by the restoring unit to restore a past display state to a new page, using display state data according to the first embodiment.

Alternatively, as illustrated in FIG. 20, the restoring unit 16 can restore the display state at a certain past time point to a new page. FIG. 20 is a diagram illustrating a process performed by the restoring unit 16 to restore the past display state on a new page, using the display state data. In the time-series restoration mode, the user slides the thumbnails 101 representing the display states laterally to select a display state to be restored. The restoring unit 16 determines the corresponding display state data 116 (the display state data 142 in FIG. 20) in the display-state list 114.

The restoring unit 16 copies the determined display state data 116 to the display state of a new page.

When the memory area for the display state is secured for each page in the RAM 203, the restoring unit 16 may copy the display state data 116 to the address corresponding to the page. When only the memory area for the current page is secured in the RAM 203, the restoring unit 16 may copy the display state data 116 to the address corresponding to the current page (in this case, the process is equivalent to the process in FIG. 19).

To restore the selected display state to a new page, the restoring unit 16 copies the object list 111 of the selected display state data to the object list 111 of the display state of the new page, copies the undo list 112 of the selected display state data to the undo list 112 of the display state of the new page, and copies the redo list 113 of the selected display state data to the redo list 113 of the display state of the new page.

In this way, the restoring unit 16 restores the past display state to the new page.

Combination of Restoration of Past Display State and Undo/Redo Functions

In the method for restoring the display state in the time-series restoration mode illustrated in, for example, FIGS. 17 to 20, a certain past display state can be restored with a smaller number of operations than the conventional undo/redo operations, but the display state is not restored in the units of operations. By contrast, when the undo/redo functions are used in the time-series restoration mode, the display apparatus 2 can restore he display state in the units of operations.

Figure 21:
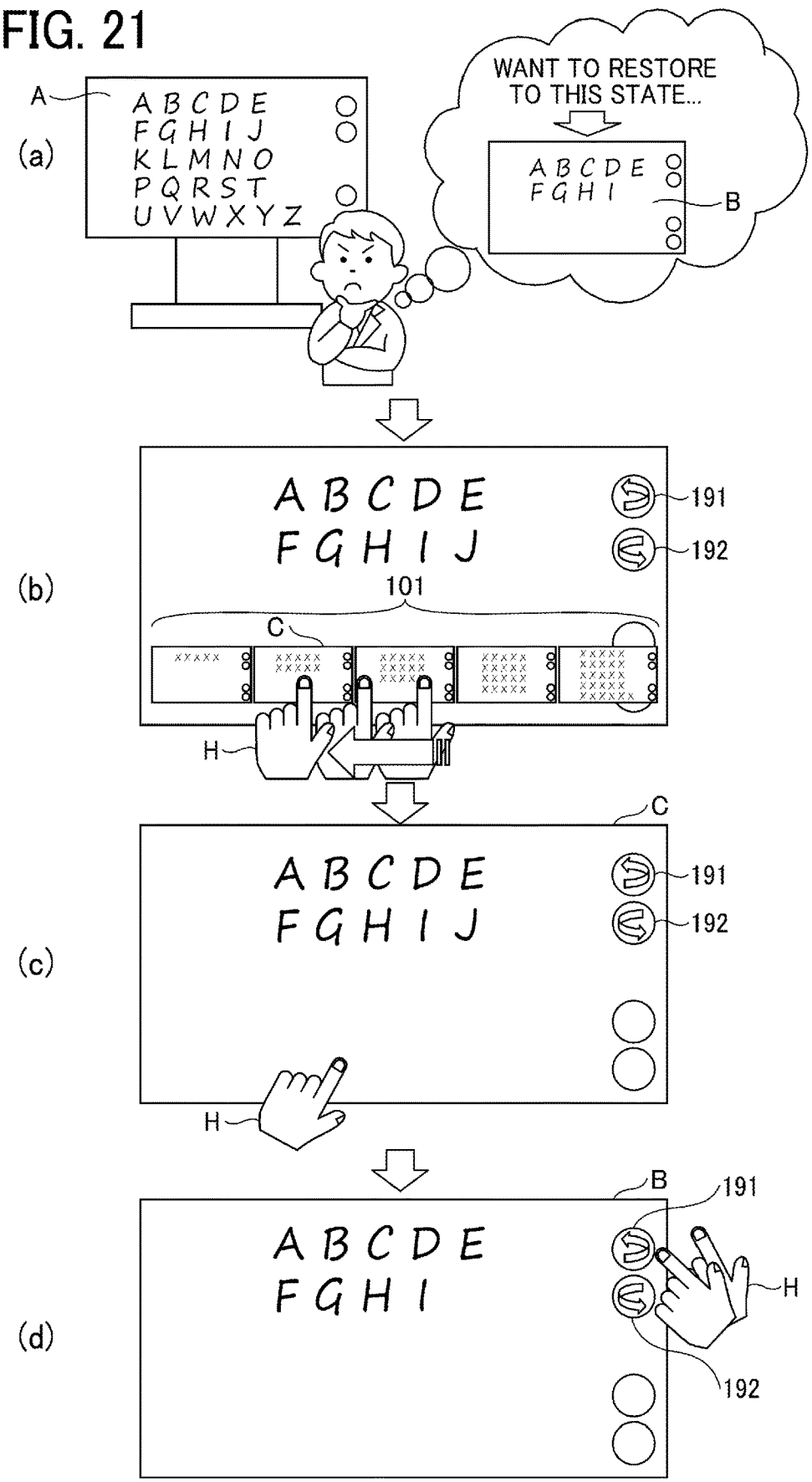
FIG. 21 is a diagram illustrating a method for restoring the display state in units of operations by combining the time-series restoration mode and undo/redo functions, according to the first embodiment.

FIG. 21 is a diagram illustrating a method for restoring the display state in units of operations by combining the time-series restoration mode and the undo/redo functions. In a part (a) of FIG. 21, the user wants to return a current display state A to a display state B presenting a text "ABCDEFGHI."

First, as illustrated in a part (b) of FIG. 21, the user slides the thumbnails 101 representing the display laterally states in the time-series restoration mode, and selects the thumbnail 101 representing a display state C closest to the display state B (not necessarily closest). The display apparatus 2 displays an undo button 191 and a redo button 192.

As illustrated in a part (c) of FIG. 21, the display state C selected by the user presents a text "ABCDEFGHIJ." In the display state C, "J" is extra with respect to the display state B.

Then, as illustrated in a part (d) of FIG. 21, the user uses the undo function to return to the display state before the input of "J." In other words, since the number of operations (strokes) to input the stroke data "J" is one, the user presses the undo button 191 once.

In this way, the number of operations for returning the display state A to the display state B is far smaller compared with returning the display state A to the display state B only by the undo function.

Figure 22B:
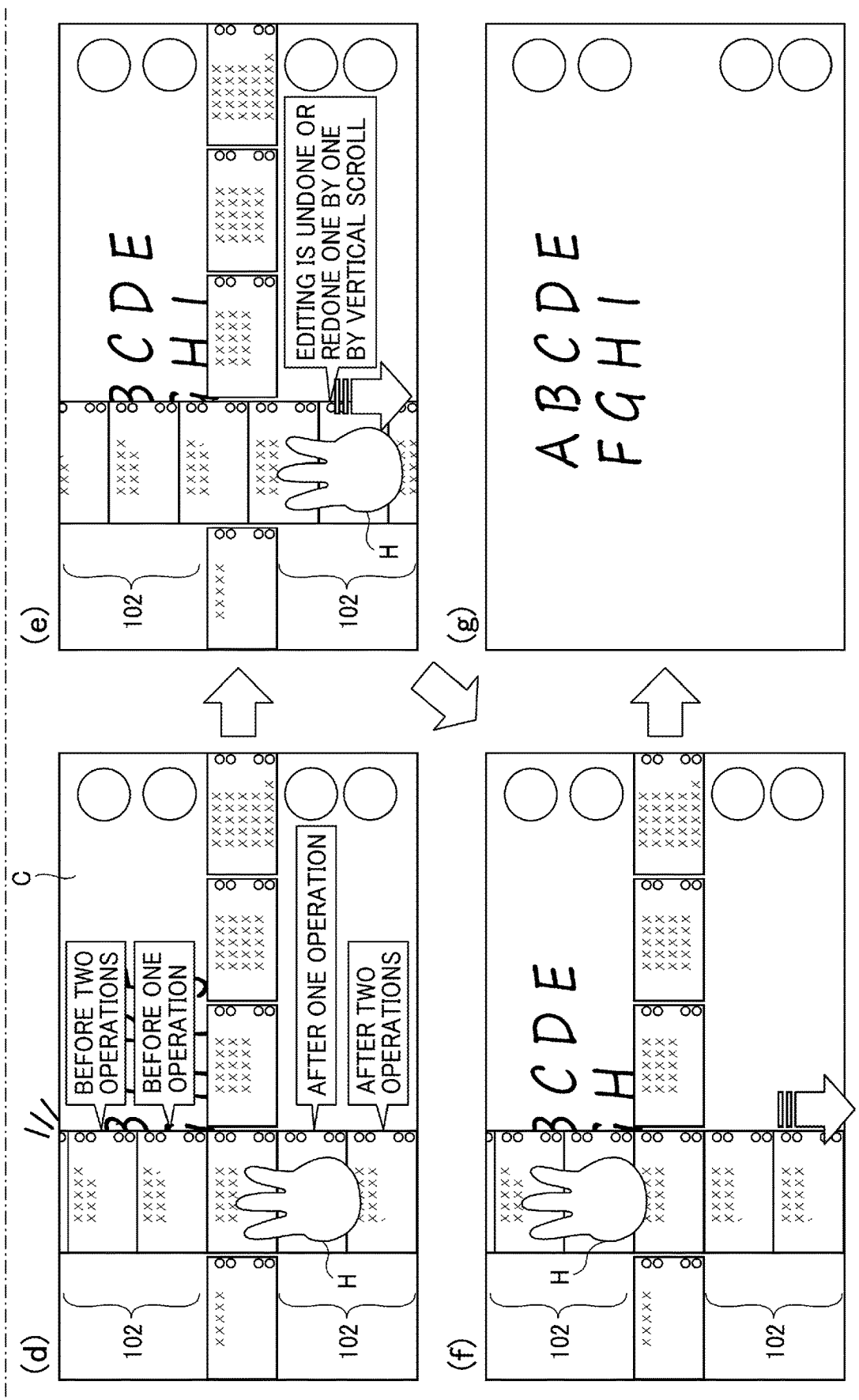

FIGS. 22A and 22B (FIG. 22) are diagrams illustrating a user interface different from that illustrated in FIG. 21 for restoring the display state in units of operations by combining the time-series restoration mode and the undo/redo functions.

In a part (a) of FIG. 22, the user wants to return the current display state A to the display state B presenting the text "ABCDEFGHI."

First, as illustrated in parts (b) and (c) of FIG. 22, the user laterally states the thumbnails 101 representing the display states by a gesture operation in the time-series restoration mode, and selects the thumbnail 101 representing the display state C closest to the display state B (not necessarily the closest). The user presses the thumbnail 101 representing the display state C with fingers of the hand H.

When the user stops the lateral sliding operation, as illustrated in a part (d) of FIG. 22, the display control unit 15 displays thumbnails 102 (examples of a second display state) vertically arranged above and below the thumbnail 101 of the display state selected by the user. The vertically arranged thumbnails 102 are scrolled vertically. In the vertical direction, starting from the display state represented by the thumbnail 101 (first image) selected by the user, the thumbnails 102 (second images) representing the display states going back in units of operations are arranged in the upward direction, and the thumbnails 102 (third images)

representing the display states (examples of a third display state) advancing in units of operations are arranged in the downward direction. In other words, the display states arranged in the upward direction correspond to the undo operation performed N times on the display state selected by lateral sliding, and the display states arranged in the downward direction correspond to the redo operation performed N times on the display state selected by lateral sliding. N times matches the number of thumbnails 101 starting from the selected thumbnail 102.

As illustrated in parts (e) and (f) of FIG. 22, when the user vertically scrolls the display states, undo/redo can be performed in units of operations.

As illustrated in a part (g) of FIG. 22, when the user presses the thumbnail 102 on the touch panel with a finger, the restoring unit 16 restores, on the display 3, the display state corresponding to the thumbnail 102 pressed by the user. As described above, in the user interface illustrated in FIG. 22, when the user changes the sliding direction, the display state can be restored in units of operations.

Instead of selecting the thumbnail 102 in response to pressing of the thumbnail 102 by the user with the finger or the electronic pen 4, the display apparatus 2 may select the thumbnail 102 that has been pressed in response to releasing of the finger or the electronic pen 4 from the thumbnail 101.

In FIG. 22, the display states for each set time or each set number of operations are displayed by lateral sliding, and the display states in units of operations are displayed by vertical sliding. However, the lateral sliding and the vertical sliding may be reversed. In addition, the display control unit 15 may display the thumbnail 101 corresponding to the redo operation above the thumbnail 101, and display the thumbnail 102 corresponding to the undo operation below the thumbnail 102.

Procedure or Operation of Restoration

Figure 23:
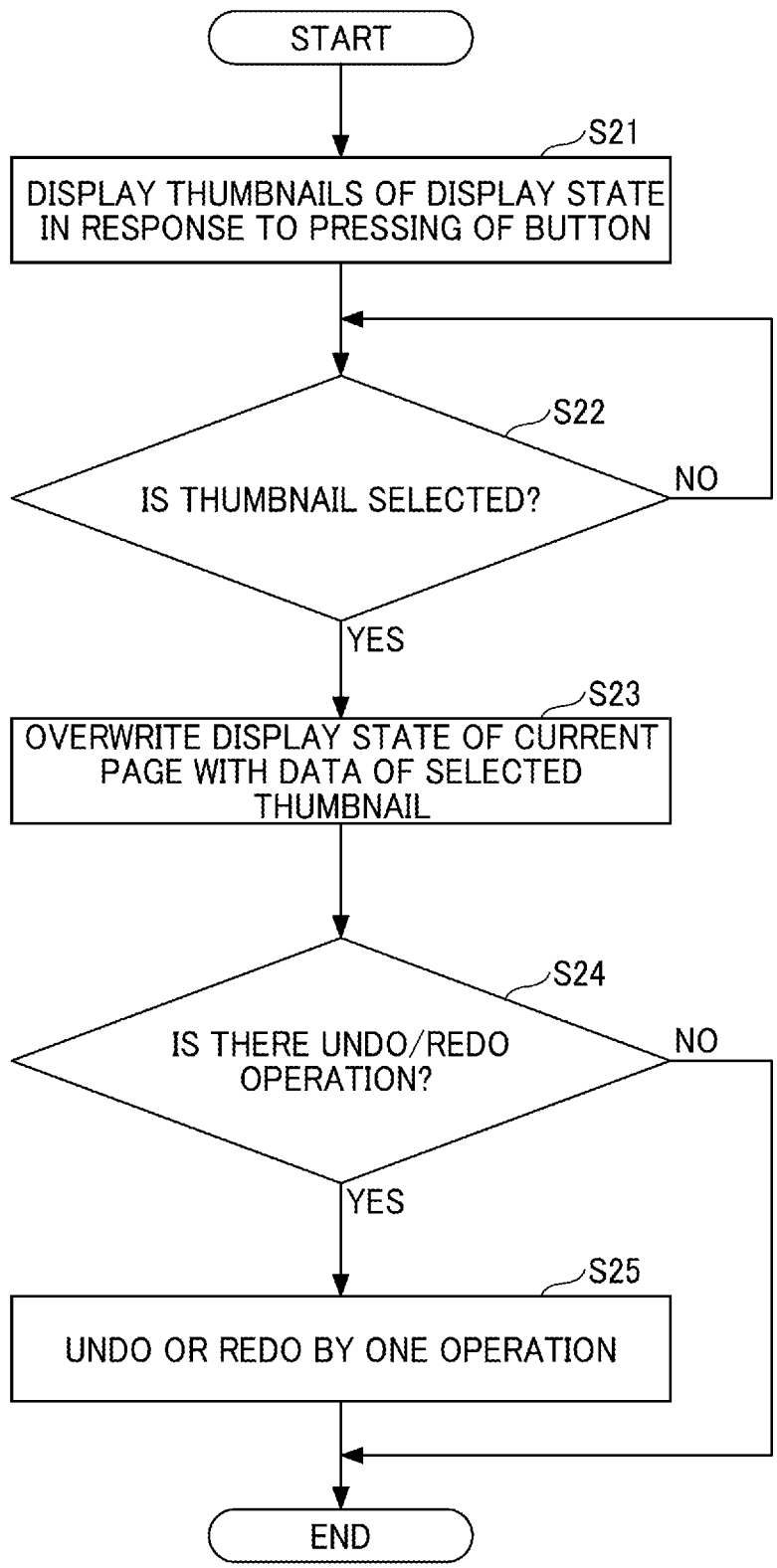
FIG. 23 is a flowchart illustrating a process performed by the restoring unit to restore a display state, according to the first embodiment.

FIG. 23 is a flowchart illustrating a process performed by the restoring unit 16 to restore a display state. FIG. 23 illustrates a case where the display state is restored in units of operations by a button operation as illustrated in FIG. 21.

First, in response to pressing of the button 150 for time-series restoration mode, the restoring unit 16 restores the display states based on the respective display state data. Then, the display control unit 15 slidably displays the thumbnails 101 representing the display states (S21). The user slides the thumbnails 101 by moving the finger touching the display 3 or the electronic pen 4 to the left or right.

The restoring unit 16 determines whether or not the operation receiving unit 19 has received selection of the thumbnail 101 by the finger or the electronic pen 4 (S22).

When the thumbnail 101 is selected (Yes in S22), the restoring unit 16 overwrites the object list 111, the undo list 112, and the redo list 113 representing the currently displayed state with the display state data corresponding to the selected thumbnail 101 (S23).

The operation receiving unit 19 determines whether the undo button 191 or the redo button 192 (see FIG. 21) is pressed (S24).

When the undo button 191 or the redo button 192 is pressed (Yes in S24), the restoring unit 16 returns (undoes) or advances (redoes) the display state by one operation with reference to the display state data in step S23 (S25).

As described above, the user can restore the display state at a certain past time point and restore the display state in units of operations.

Figure 24:
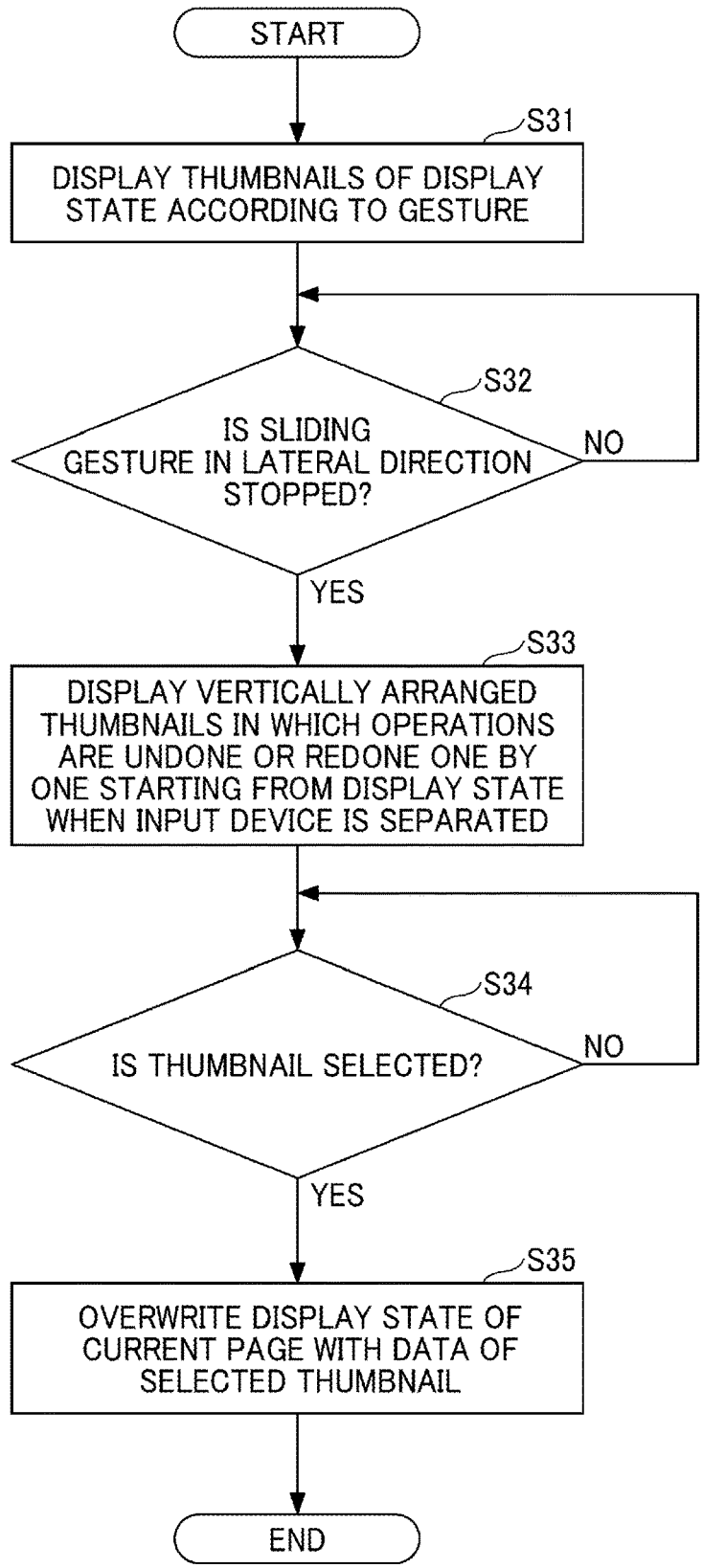
FIG. 24 is a flowchart illustrating a process performed by the restoring unit to restore a display state, according to the first embodiment.

FIG. 24 is a flowchart illustrating a process performed by the restoring unit 16 to restore a display state. FIG. 24 illustrates a case where the display state is restored by the lateral and vertical slide operations by the gesture operation as illustrated in FIG. 22.

First, the restoring unit 16 restores the display state based on the display state data 116 according to the gesture operation. Then, the display control unit 15 slidably displays the thumbnails 101 representing the display states (S31).

The restoring unit 16 determines whether or not the sliding (gesture operation) in the lateral direction has stopped (S32).

When the sliding in the lateral direction is stopped (Yes in S32), the restoring unit 16 displays the vertically arranged thumbnails 102 in which the display state is returned or advanced in units of operations (in other words, per stroke), starting from the thumbnail 101 (as a center) from which the three fingers are just separated (S33).

In other words, the restoring unit 16 restores the display states in which operations are canceled one by one according to the operation records of the undo list 112 included in the display state data corresponding to the selected thumbnail 101, by the number of the operation records. The display control unit 15 arranges, above the thumbnail 101 selected by the lateral sliding, the thumbnail 102 representing the restored display states in time series. Similarly, the restoring unit 16 creates the display states in which operations are advanced one by one according to the operation cancellation records of the redo list 113 included in the selected display state data, by the number of operation cancellation records. The display control unit 15 arranges, below the thumbnail 101 selected by the lateral sliding, the thumbnails 102 representing the restored display states in time series.

Next, the restoring unit 16 determines whether or not the operation receiving unit 19 has received the selection of the thumbnail 102 by the finger or the electronic pen 4 (S34).

When the thumbnail 102 is selected (Yes in S34), the restoring unit 16 overwrites the object list 111, the undo list 112, and the redo list 113 representing the currently displayed state with the display state data corresponding to the selected thumbnail 102 (restored or advanced by one operation) (S35).

As described above, the display apparatus 2 allows the user to restore the display state at a certain past time point by the gesture operation.

Application to Client-Server System

Figure 25:
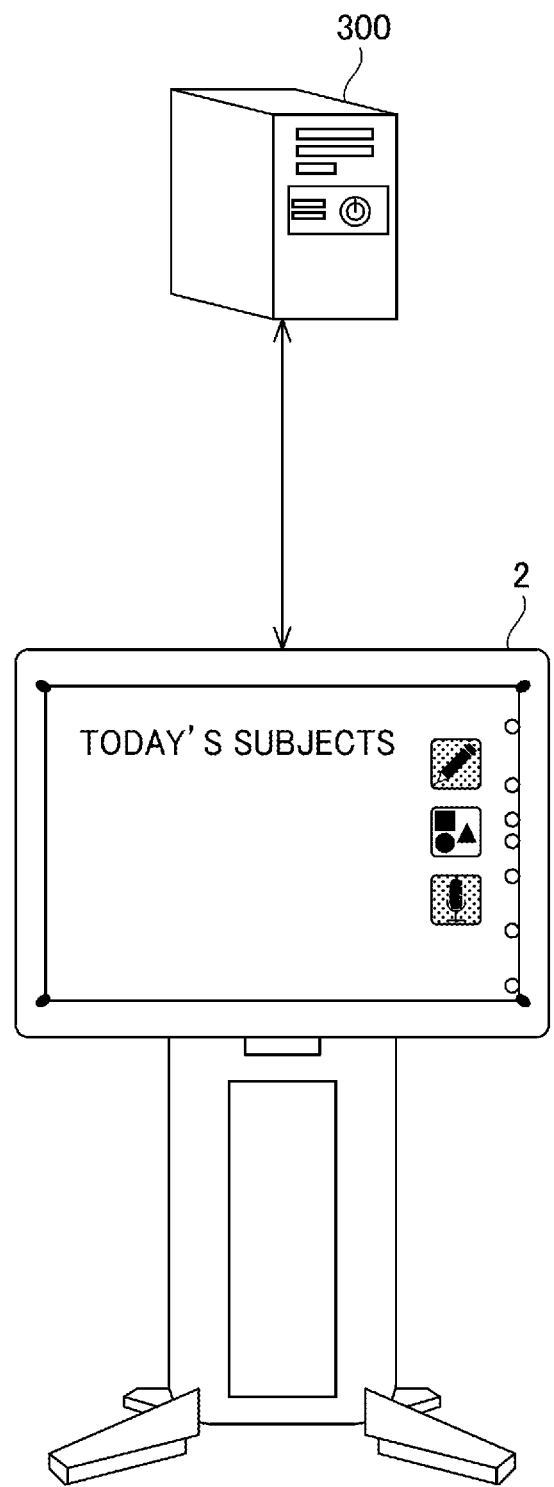
FIG. 25 is a schematic diagram illustrating a configuration of a display system according to a second embodiment.

The function of the display apparatus 2 can also be implemented in a client-server system as illustrated in FIG. 25. FIG. 25 is a schematic diagram illustrating an example of a configuration of a display system 310 according to a second embodiment. The display apparatus 2 and a server 300 are connected to each other through a network such as the Internet. The hardware configuration of the server 300 may be substantially the same as that of a general-purpose information processing apparatus or computer such as a PC.

Figure 26:
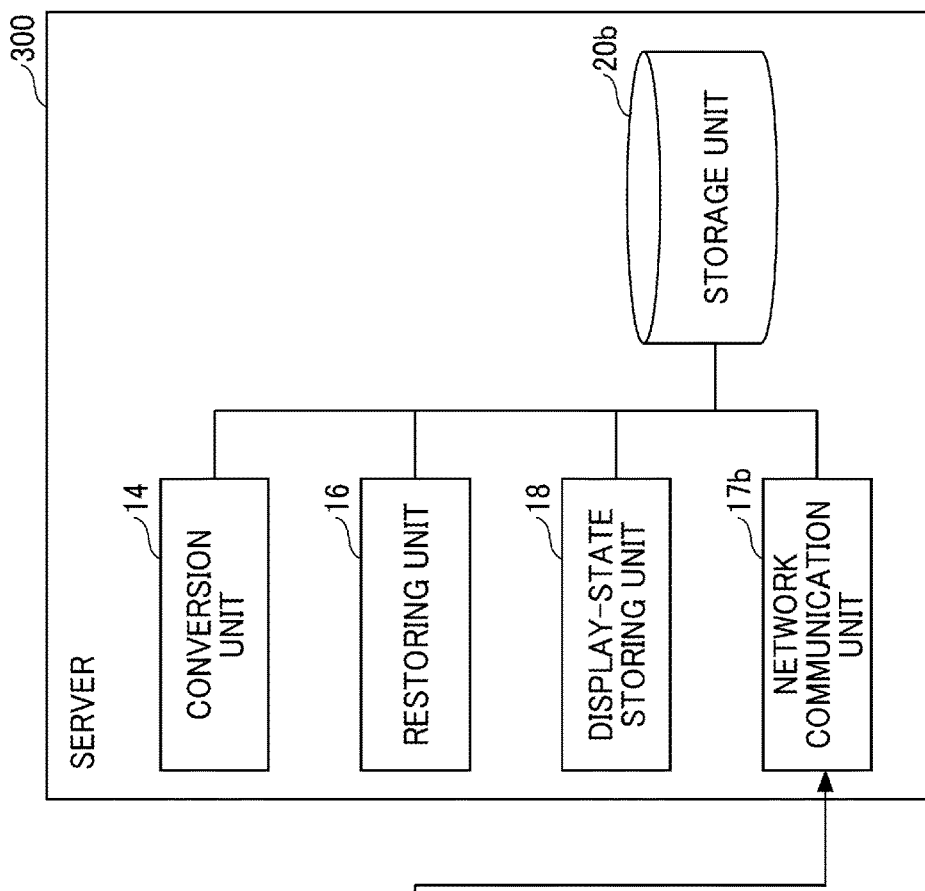
FIG. 26 is a block diagram illustrating functional configurations of a display apparatus and a server in the display system according to the second embodiment.

FIG. 26 is a block diagram illustrating functional configurations of the display apparatus 2 and the server 300 in the display system 310. In the display system 310, the display apparatus 2 includes the contact position detection unit 12, the drawing data generation unit 13, the display control unit 15, and the operation receiving unit 19 illustrated in FIG. 4. The display apparatus 2 includes a network communication unit 17a similar to the network communication unit 17 illustrated in FIG. 4. The display apparatus 2 includes a storage unit 20a that stores the object list 111, the undo list 112, and the redo list 113 indicating the display state of the current page. The data in the storage unit 20a of the display apparatus 2 may be synchronized to the same state as that of a storage unit 20b of the server 300.

On the other hand, the server 300 includes the conversion unit 14, the restoring unit 16, the display-state storing unit 18, and a network communication unit 17b (an example of a second communication unit) similar to the network communication unit 17 illustrated in FIG. 4. The storage unit 20b of the server 300 stores the object list 111, the undo list 112, the redo list 113, and the display-state list 114 of each page.

The network communication unit 17a (an example of a first communication unit) of the display apparatus 2 transmits an operation content to the server 300 for each operation that causes a change in the object list 111. The server 300 performs processes similar to those in the flowcharts of FIGS. 11, 12, 23, and 24, so as to store the display state data and perform restoration processing.

Figure 27:
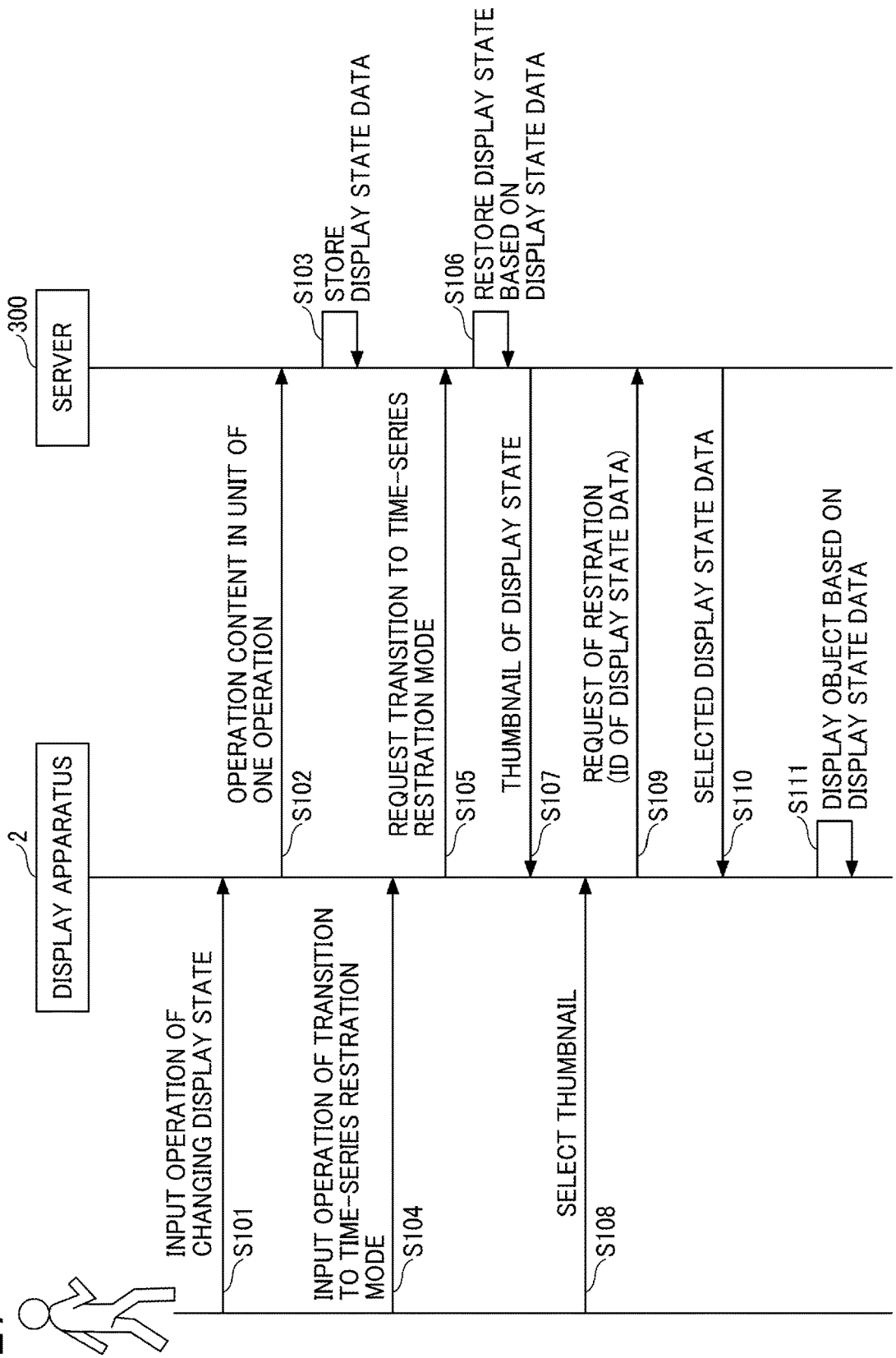
FIG. 27 is a sequence diagram illustrating a process of storing and restoring a display state performed by the display system according to the second embodiment.

FIG. 27 is a sequence diagram illustrating an example of storing and restoring a display state performed by the display system 310.

S101: The user inputs an operation of changing the display state of an object on the display apparatus 2.

The operation receiving unit 19 receives the operation.

S102: The network communication unit 17a of the display apparatus 2 transmits, to the server 300, the operation content related to the object, in a unit of one operation.

S103: The network communication unit 17b of the server 300 receives the operation content in the unit of one operation, and the display-state storing unit 18 performs the process of FIG. 11 or 12 to store the display state data.

Note that the steps S101 to S103 are repeatedly executed.

S104: Next, the user who wants to restore the display state at a certain past time point inputs an operation of transition to the time-series restoration mode. This operation may be pressing of the button 150 for time-series restoration mode or a gesture operation.

S105: The operation receiving unit 19 of the display apparatus 2 receives the operation, and the network communication unit 17a transmits, to the server 300, a request for transition to the time-series restoration mode.

S106: The network communication unit 17b of the server 300 receives the request for transition to the time-series restoration mode, and the restoring unit 16 restores the display state based on the stored display state data 116.

S107: The network communication unit 17b of the server 300 transmits the thumbnails 101 each representing the display states to the display apparatus 2. The network communication unit 17a of the display apparatus 2 receives the thumbnails 101 each representing the display states, and the display control unit 15 displays the thumbnails 101 to be slid in the lateral direction.

S108: The user selects a desired thumbnail 101.

S109: The operation receiving unit 19 of the display apparatus 2 receives the selection. Then, the network communication unit 17a transmits a restoration request to the server 300 with designation of identification information (for example, a page number) of the display state data.

S110: The network communication unit 17b of the server 300 receives the restoration request and transmits the display state data specified by the identification information to the display apparatus 2.

S111: The network communication unit 17a of the display apparatus 2 receives the display state data and overwrites the object list 111, the undo list 112, and the redo list 113 of the current display state with the received display state data.

Thereafter, the user can undo or redo the editing in units of operations by pressing the undo button 191 or the redo button 192. Since the display apparatus 2 has already received the undo list 112 and the redo list 113, the display control unit 15 returns or advances the display state of the object displayed in step S111 by one operation in response to the pressing of the undo button 191 or the redo button 192.

In order to provide the user interface as illustrated in FIG. 22, the server 300 transmits the thumbnails 102 in addition to the thumbnails 101 in step S107. The display apparatus 2 displays a user interface as illustrated in FIG. 22, and requests the server 300 to transmit the display state data corresponding to the thumbnail 102 selected by the user. Alternatively, in step S107, the server 300 may transmit each display state data in addition to the thumbnails 101. The display apparatus 2 displays the user interface as illustrated in FIG. 22 using the display state data, and displays the display state corresponding to the thumbnail 102 selected by the user.

As described above, in the display system 310, the display apparatus 2 and the server 300 interactively process and display objects. In other words, without the dedicated display apparatus 2, the user can use a function equivalent to that of the dedicated display apparatus 2 by using a general-purpose information processing apparatus having a touch panel.

In addition, since the object list 111, the undo list 112, the redo list 113, and the display-state list 114 are stored in the server 300, the display apparatus 2 or a PC disposed at a remote site can connect to the server 300 and share the display state in real time.

As described above, the display apparatus 2 according to the above-described embodiments is advantageous over a comparative example in which the undo/redo operations are performed by the number of operations to restore the desired display state. That is, to restore a display state before the input of hand drafted data "A" having three strokes, the undo/redo operation is performed three times.

By contrast, the display apparatus 2 according to the above-described embodiments restores a display state at a certain past time point with a smaller number of operations (at least one operation), compared with the comparative example in which the display state is restored one by one. In other words, the display apparatus 2 improves usability.

Further, the display apparatus 2 according to the above-described embodiments can restore a desired display state with a small number of operations even in a situation where the display apparatus 2 is shared online such that users located at a plurality of sites freely perform hand drafted input and the number of operations is greater.

Variations

Although the example embodiments of the present invention are described above, the above-described embodiments do not limit the present invention. Thus, numerous additional modifications and variations are possible in light of the above teachings within the scope of the present invention. Any one of the above-described operations may be performed in various other ways, for example, in an order different from the one described above.

For example, although the display state of stroke data is stored in the above-described embodiments, the object may be a text. In the case of a text, the unit of one operation is a single character, or multiple characters converted at a time.

In the description above, the display apparatus 2 being an electronic whiteboard is described as an example but is not limited thereto. A device having substantially the same functions as the electronic whiteboard may be referred to as electronic blackboard, an electronic information board, an interactive board, or the like. The present disclosure is applicable to any information processing apparatus having a touch panel. Examples of the information processing apparatus with a touch panel include, but not limited to, a projector, an output device such as a digital signage, a head up display, an industrial machine, an imaging device, a sound collecting device, a medical device, a network home appliance, a laptop computer (personal computer or PC), a mobile phone, a smartphone, a tablet terminal, a game console, a personal digital assistant (PDA), a digital camera, a wearable PC, and a desktop PC.

Although the coordinates of the tip of the electronic pen 4 are detected using the touch panel in the above-described embodiments, the display apparatus 2 may detect the coordinates of the tip of the electronic pen 4 using ultrasonic waves. For example, the electronic pen 4 emits an ultrasonic wave in addition to the light, and the display apparatus 2 calculates a distance based on the arrival time of the ultrasonic wave. The display apparatus 2 determines the position of the electronic pen 4 based on the direction and the distance, and a projector draws (projects) the trajectory of the electronic pen 4 based on stroke data.

In the block diagram such as FIG. 4, functional units are divided into blocks in accordance with the main functions of the display apparatus 2, in order to facilitate understanding the operation by the display apparatus 2. No limitation is intended by how the functions are divided by process or by the name of the functions. The processing implemented by the display apparatus 2 may be divided into a larger number of processing units depending on the content of the processing. In addition, a single processing unit can be further divided into a plurality of processing units.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure can provide significant improvements in computer capability and functionality. These improvements allow users to take advantage of computers that provide more efficient and robust interaction with displays that receive input of information and present the information in an information processing apparatus.

In addition, embodiments of the present disclosure can provide a better user experience through the use of a more efficient, powerful, and robust user interface. Such a user interface provides a better interaction between a human and a machine.

As described above, the present disclosure includes the following aspects.

Aspect 1

A display apparatus that displays an object on a display includes a display-state storing unit, an operation receiving unit, and a restoring unit. The display-state storing unit stores, in a memory, display state data representing a display state of the displayed object each time a condition is satisfied.

The operation receiving unit receives selection of one of the display state data. The restoring unit restores the display state of the object based on the selected display state data.

Aspect 2

In the display apparatus according to Aspect 1, the display-state storing unit stores the display state data only in a case where the condition is satisfied and the display state of the displayed object is changed after the display state data is stored.

Aspect 3 In the display apparatus according to Aspect 1, each time the condition is satisfied, the display-state storing unit stores a linear list of one or more past operation records till a time point at which particular display state data is stored, in association with the particular display state data.

Aspect 4

In the display apparatus according to Aspect 3, the display-state storing unit stores, in association with last display state data stored, a linear list of one or more operation cancellation records each representing an operation having caused a change in the display state of the displayed object after the display state data is stored.

Aspect 5

The display apparatus according to Aspect 4 further includes a display control unit to linearly display a plurality of images each of which represents the display state of the object restored by the restoring unit. The display control unit slides the plurality of images in a direction of an instruction operation by an input device to a touch panel. The restoring unit restores, on the display, the display state of the object corresponding to the image selected by the input device.

Aspect 6

In the display apparatus according to Aspect 5, the restoring unit restores the restored display state of the object by a number of times an undo operation is received, in accordance with the past operation record. The restoring unit advances the restored display state of the object by a number of times a redo operation is received, in accordance with the operation cancellation record.

Aspect 7

The display apparatus according to Aspect 4 further includes a display control unit to linearly display a plurality of images each of which represents the display state of the object restored by the restoring unit. The display control unit slides the plurality of images in a direction of an instruction operation by an input device to a touch panel.

In a case where the input device stops, the display control unit displays, above one of the plurality of images being touched by the input device, an image representing a second display state returned, from the display state corresponding to the image, in accordance with the past operation record, and displays, below the image being touched by the input device, an image representing another second display state advanced, from the display state corresponding to the image, in accordance with the operation cancellation record.

Aspect 8

In the display apparatus according to any one of Aspects 1 to 7, the condition is that a set time has elapsed, and the display apparatus receives the set time.

Aspect 9

In the display apparatus according to any one of Aspects 1 to 7, the condition is that the number of operations reaches a set number, and the display apparatus receives the set number of operations.

Aspect 10

In the display apparatus according to any one of Aspects 5 to 7, the display control unit displays the display state of the object restored by the restoring unit on a new page.

Aspect 11

In the display apparatus according to any one of Aspects 1 to 10, an application that displays a window is executed on the display apparatus, and the display-state storing unit includes a screen of the window of the application in the display state data.

The invention claimed is:

1. A display apparatus comprising
circuitry configured to:
display an object on a display;
store, in a memory, display state data representing a display state of the object with a plurality of images of the object each time a condition is satisfied, the display state data including an object list in which a type, a position, and a size are identified for each object displayed on the display;
receive selection of one of the plurality of images in the display state data; and
restore the display state of the object based on the type, the position, and the size included in the object list in response to the selection of the one of the plurality of images in the display state data.

2. The display apparatus according to claim 1,
wherein the circuitry is configured to store the display state data in a case where the condition is satisfied and the display state of the object is changed after the display state data is stored.

3. The display apparatus according to claim 1,
wherein, each time the condition is satisfied, the circuitry is configured to store a linear list of one or more past operation records till a time point at which particular display state data is stored, in association with the particular display state data.

4. The display apparatus according to claim 3,
wherein the circuitry is configured to store, in association with last display state data stored, a linear list of one or more operation cancellation records each representing an operation having changed the display state of the object after the last display state data is stored.

5. The display apparatus according to claim 4,
wherein the circuitry is configured to:
linearly display the plurality of images of the object whose display state data is restored;
slide the plurality of images in a direction of an instruction operation by an input device to a touch panel; and
restore, on the display, the display state of the object corresponding to one of the plurality of images selected by the input device.

6. The display apparatus according to claim 5,
wherein the circuitry is configured to:
further restore the restored display state of the object by a number of times an undo operation is received, in accordance with the one or more past operation records; and
advance the restored display state of the object by a number of times a redo operation is received, in accordance with the one or more operation cancellation records.

7. The display apparatus according to claim 5,
wherein the circuitry is configured to display, on a new page, the display state of the object restored.

8. The display apparatus according to claim 4,
wherein the circuitry is configured to:
linearly display a plurality of first images each of which represents a first display state of the object restored; and
slide the plurality of first images in a direction of an instruction operation by an input device to a touch panel, and
wherein, in response to a stop of the input device, the circuitry is configured to:
display, above one of the plurality of first images being touched by the input device, one or more second images each representing a second display state returned from a first display state represented by the one of the plurality of first images, in accordance with the one or more past operation records; and
display, below the one of the plurality of first images, one or more third images each representing a third display state advanced from the first display state, in accordance with the one or more operation cancellation records.

9. The display apparatus according to claim 1,
wherein the condition is that a set time has elapsed, and the circuitry is configured to receive a setting of the set time.

10. The display apparatus according to claim 1,
wherein the condition is that a number of operations reaches a set number, and the circuitry is configured to receive a setting of the set number.

11. The display apparatus according to claim 1,
wherein, in a case where an application that displays a window on the display is executed on the display apparatus, the circuitry is configured to include the window of the application in the display state data.

12. A display method performed by a display apparatus, the method comprising:
displaying an object on a display;
storing, in a memory, display state data representing a display state of the object with a plurality of images of the object each time a condition is satisfied, the display state data including an object list in which a type, a position, and a size are identified for each object displayed on the display;
receiving selection of one of the plurality of images in the display state data; and
restoring the display state of the object based on the type, the position, and the size included in the object list in response to the selection of the one of the plurality of images in the display state data.

13. A non-transitory recording medium storing a plurality of program codes which, when executed by one or more processors, causes the processors to perform the method according to claim 12.

14. A display system comprising:
a server including first circuitry; and
a display apparatus including second circuitry configured to:
display an object on a display;
receive an operation to change a display state of the object, the operation being performed on the object; and
transmit, to the server via a network, an operation content of the operation being performed on the object,
the first circuitry of the server being configured to:
store, in a memory, display state data representing the display state of the object each time a condition is satisfied, the display state data including an object list in which a type, a position, and a size are identified for each object displayed on the display;

restore the display state of the object based on the type, the position, and the size included in the object list in response to a request from the display apparatus; and transmit, to the display apparatus via the network, a plurality of images each of which represents the display state of the object restored, and the second circuitry of the display apparatus being configured to linearly display the plurality of images on the display.

* * * * *